US012722386B2

(12) United States Patent
Lee et al.

(10) Patent No.: US 12,722,386 B2
(45) **Date of Patent: *Sep. 1, 2026**

(54) INKJET PRINTING APPARATUS, METHOD OF PRINTING INK USING THE SAME AND METHOD OF FABRICATING DISPLAY DEVICE

(71) Applicant: Samsung Display Co., LTD., Yongin-si (KR)

(72) Inventors: Dong Jun Lee, Yongin-si (KR); Che Ho Lim, Cheonan-si (KR); Ho Yong Shin, Suwon-si (KR); Gyeong Eun Eoh, Seongnam-si (KR); Jun Hwi Lim, Seoul (KR); Seon Uk Lee, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 60 days.

This patent is subject to a terminal disclaimer.

(21) Appl. No.: 18/592,167

(22) Filed: Feb. 29, 2024

(65) Prior Publication Data

US 2024/0253360 A1 Aug. 1, 2024

Related U.S. Application Data

(63) Continuation of application No. 17/702,768, filed on Mar. 23, 2022, now Pat. No. 11,919,317.

(30) Foreign Application Priority Data

Jul. 12, 2021 (KR) ........................ 10-2021-0091243

(51) Int. Cl.
*B41J 2/175* (2006.01)

(52) U.S. Cl.
CPC ................................ *B41J 2/17566* (2013.01)

(58) Field of Classification Search
CPC .... H10K 71/135; H10K 71/00; H10K 71/191; B41J 2/17566; B41J 11/002; B41J 11/0021
See application file for complete search history.

(56) References Cited

U.S. PATENT DOCUMENTS 3,879,129 A 4/1975 Inoue
4,643,573 A 2/1987 McLachlan et al.
(Continued)

FOREIGN PATENT DOCUMENTS

CN 104764680 A 7/2015
CN 106769721 A 5/2017
(Continued)

*Primary Examiner* — Jason S Uhlenhake
(74) *Attorney, Agent, or Firm* — CANTOR COLBURN LLP

(57) ABSTRACT

An inkjet printing apparatus, method of printing ink using the same and method of fabricating display device are provided. The method of printing ink includes: ejecting ink in which a plurality of particles is dispersed from an inkjet head; irradiating the ejected ink with a first light and a second light having different wavelengths to acquire data on a first exit light and a second exit light emitted from the ink; calculating a concentration of the particles in the ink from the data on the first exit light and the second exit light; and checking whether the concentration is out of an error range from a reference value, where the first light has a wavelength of about 500 nm or less, and the second light has a wavelength of about 1000 nm or more.

20 Claims, 33 Drawing Sheets

(56) References Cited

U.S. PATENT DOCUMENTS

| | | | |
|---|---|---|---|
| 5,260,764 | A | 11/1993 | Fukuda et al. |
| 7,605,919 | B2 | 10/2009 | Oma et al. |
| 8,912,007 | B2 | 12/2014 | Bjornson et al. |
| 11,193,871 | B2 | 12/2021 | Chang et al. |
| 11,919,317 | B2 | 3/2024 | Lee et al. |
| 2004/0179194 | A1 | 9/2004 | Schmilovitch et al. |
| 2009/0244163 | A1 | 10/2009 | Govyadinov |
| 2012/0026224 | A1 | 2/2012 | Anthony et al. |
| 2015/0353820 | A1 | 12/2015 | Tang et al. |
| 2016/0320284 | A1* | 11/2016 | Spriggs ................ G01N 21/532 |
| 2019/0283444 | A1* | 9/2019 | Shiomoto ................ B41J 2/195 |

FOREIGN PATENT DOCUMENTS

| | | | |
|---|---|---|---|
| CN | 112284986 | A | 1/2021 |
| CN | 112345421 | A | 2/2021 |
| CN | 112903547 | A | 6/2021 |
| CN | 219338978 | U | 7/2023 |
| JP | H03233344 | A | 10/1991 |
| JP | H0552750 | A | 3/1993 |
| JP | 2000009630 | A | 1/2000 |
| JP | 2000218797 | A | 8/2000 |
| JP | 2006170902 | A | 6/2006 |
| JP | 201923629 | A | 2/2019 |
| JP | 2019164123 | A | 9/2019 |
| KR | 1020170052256 | A | 5/2017 |

* cited by examiner

100: 111, 113
130: 131, 133

INKJET PRINTING APPARATUS, METHOD OF PRINTING INK USING THE SAME AND METHOD OF FABRICATING DISPLAY DEVICE

This application is a continuation of U.S. patent application Ser. No. 17/702,768, filed on Mar. 23, 2022, which claims priority to Korean Patent Application No. 10-2021-0091243, filed on Jul. 12, 2021, and all the benefits accruing therefrom under 35 U.S.C. 119, the contents of which in its entirety are herein incorporated by reference.

BACKGROUND

1. Technical Field

The disclosure relates to an inkjet printing apparatus, a method of printing ink using the same and a method of fabricating a display device.

2. Description of the Related Art

The importance of a display device has steadily increased with the development of multimedia technology. In response thereto, various types of display devices such as an organic light emitting display ("OLED"), a liquid crystal display ("LCD") and the like have been used.

As a device for displaying an image of the display device, there is a self-light emitting display device including a light emitting element. The self-light emitting display device includes an organic light emitting display device using an organic material as a light emitting material as a light emitting element, an inorganic light emitting display device using an inorganic material as a light emitting material, or the like.

In order to form an organic material layer included in the display device or to dispose an inorganic light emitting diode, an inkjet printing apparatus may be used. After printing the ink in which the particles are dispersed, a post-treatment process may be performed to dispose the particles in a specific area or to form an organic material layer in which the particles are dispersed.

When the display device is fabricated using an inkjet printing apparatus, it may be desirable that the concentration of particles included per unit droplet of the ink ejected during the printing process be uniform in order to secure product perfection of the display device.

SUMMARY

Aspects of the disclosure provide an inkjet printing apparatus capable of measuring the concentration of particles in a droplet or ink ejected from an inkjet head in real time, a method of printing the ink using the same, and a method of fabricating a display device.

However, aspects of the disclosure are not restricted to the one set forth herein. The above and other aspects of the disclosure will become more apparent to one of ordinary skill in the art to which the disclosure pertains by referencing the detailed description of the disclosure given below.

The inkjet printing apparatus according to one embodiment may sense a change in the concentration of particles in the ink in real time by irradiating the ink ejected from a nozzle with each light of different wavelength bands.

In the method of printing the ink according to one embodiment, the ink may be ejected while sensing the concentration of particles in the ink using the inkjet printing apparatus, and a product of uniform quality may be fabricated by controlling the particle concentration of the ink injected into the inkjet head corresponding to a change in the concentration of the particles, or controlling the concentration of particles in the ink seated in a specific area.

However, the effects of the disclosure are not limited to the aforementioned effects, and various other effects are included in the specification.

According to an embodiment of the disclosure, a method of printing ink includes: ejecting ink in which a plurality of particles is dispersed from an inkjet head; irradiating the ejected ink with a first light and a second light having different wavelengths to acquire data on a first exit light and a second exit light emitted from the ink; calculating a concentration of the particles in the ink from the data on the first exit light and the second exit light; and checking whether the concentration is out of an error range from a reference value, where the first light has a wavelength of about 500 nanometers (nm) or less, and the second light has a wavelength of about 1000 nm or more.

The first exit light may be light obtained by scattering the first light irradiated to the ink, and the second exit light may be light obtained by refracting the second light irradiated to the ink.

The calculating of the concentration of the particles may include: acquiring data on the number of the particles in the ink from the data on the first exit light, and acquiring data on a volume of the ink from the data on the second exit light.

The method of printing the ink may further include calculating a concentration change value of the particles in the ink from the data on the first exit light and the second exit light.

The method may further include based on determination that the concentration is out of the error range from the reference value, controlling the concentration of the particles in the ink injected into the inkjet head.

The method may further include before ejecting the ink from the inkjet head, setting the reference value.

The reference value may include a normalized scattering intensity of light emitted from the ink and a standard deviation value of the normalized scattering intensity when the first light and the second light are irradiated to ink having different particle concentrations, the acquiring of the data on the first exit light and the second exit light includes acquiring normalized scattering intensities of the first exit light and the second exit light and standard deviation values of the normalized scattering intensities, and the calculating of the concentration of the particles in the ink includes calculating the concentration of the particles in the ink by comparing the normalized scattering intensity and the standard deviation value of the reference value with the data on the first exit light and the second exit light.

The ink may be ejected from the inkjet head in a first direction, the first light may be irradiated in a second direction perpendicular to the first direction, and the second light may be irradiated after the first light is irradiated.

The first exit light emitted from the ink may be reflected by a reflector having a center of curvature in a path through which the ink is ejected and having a curved outer surface.

The ink may be ejected from the inkjet head in a first direction, and the first light and the second light may be irradiated in different directions and irradiated to the ink at the same time, respectively.

According to an embodiment of the disclosure, an inkjet printing apparatus includes: an inkjet head which ejects ink in which a plurality of particles are dispersed; a first light irradiation device and a second light irradiation device which irradiate lights of different wavelength bands, respectively, to the ejected ink; a first sensing device on which a first exit light is incident, where the first exit light is obtained by scattering a first light irradiated from the first light irradiation device and incident on the ink; a second sensing device on which a second exit light is incident, where the second exit light is obtained by scattering a second light irradiated from the second light irradiation device and incident on the ink; and a processor to which data on the first exit light and the second exit light incident on the first sensing device and the second sensing device, respectively, are inputted, where the first light irradiated from the first light irradiation device has a wavelength of about 500 nm or less, and the second light irradiated from the second light irradiation device has a wavelength of about 1000 nm or more.

The ink may be ejected from the inkjet head in a first direction, and the first light irradiation device may irradiate the first light in a second direction perpendicular to the first direction.

The second light irradiation device may be disposed to be spaced apart from the first light irradiation device in the first direction, and irradiate the second light in the second direction.

The first light irradiation device and the second light irradiation device may irradiate the first light and the second light to different areas, respectively, in a path through which the ink is ejected.

The first sensing device may be disposed opposing and to face the first light irradiation device with respect to a path through which the ink is ejected, and the second sensing device may be disposed opposing and to face the second light irradiation device with respect to the path through which the ink is ejected.

The inkjet printing apparatus may further include a first reflector disposed to be spaced apart from the first light irradiation device, and the first reflector may have a center of curvature in a path through which the ink is ejected and have a curved outer surface, where the first exit light may be reflected from the first reflector and is incident on the first sensing device.

The first sensing device may be disposed on a first side opposite to a second where the first reflector is located with respect to the path through which the ink is ejected.

The inkjet printing apparatus may further include a second reflector disposed to be spaced apart from the second light irradiation device, and the second reflector may have a center of curvature in the path through which the ink is ejected and have a curved outer surface, where the second exit light may be reflected from the second reflector and is incident on the second sensing device.

The second light irradiation device may be disposed to be spaced apart from the first light irradiation device in the first direction and irradiate the second light in a direction between the first direction and the second direction, and the first light irradiation device and the second light irradiation device may irradiate the first light and the second light to the ejected ink, respectively.

The processor may store data on the first exit light and the second exit light according to different concentrations of the particles in the ink.

According to an embodiment of the disclosure, a method of fabricating a display device includes: preparing a target substrate including a first area and a second area; ejecting a first ink in which particles are dispersed to the first area of the target substrate from a first nozzle; irradiating a first light and a second light having different wavelengths to the ink ejected from the first nozzle to acquire data on a first exit light and a second exit light emitted from the first ink; calculating a concentration of the particles in the first ink from the data on the first exit light and the second exit light; checking whether the concentration is out of an error range from a reference value; and ejecting a second ink in which the particles are dispersed from a second nozzle different from the first nozzle.

The first light may have a wavelength of about 500 nm or less, and the second light has a wavelength of about 1000 nm or more.

The particles may include titanium oxide ($TiO2$).

The ejecting of the second ink may include ejecting the second ink to the first area from the second nozzle when it is determined that the concentration is out of the error range from the reference value.

The first ink and the second ink ejected to the first area may form a first ink pattern.

The ejecting of the second ink may include ejecting the second ink to the second area from the second nozzle when it is determined that the concentration is not out of the error range from the reference value.

The first ink ejected to the first area may form a first ink pattern, and the second ink ejected to the second area may form a second ink pattern different from the first ink pattern.

The method of fabricating the display device may further comprise ejecting a third ink in which particles are dispersed to the first area from a third nozzle different from the first nozzle.

The method of fabricating the display device may further comprise ejecting a third ink in which particles are dispersed to the second area from a third nozzle different from the first nozzle.

The acquiring of the data on the first exit light and the second exit light may include irradiating the first light and the second light to the second ink ejected from the third nozzle to acquire data on a third exit light and a fourth exit light emitted from the third ink, and the calculating of the concentration of the particles in the ink may include calculating a concentration of the particles in the third ink from the data on the third exit light and the fourth exit light, and checking whether the concentration is out of an error range from a reference value.

BRIEF DESCRIPTION OF THE DRAWINGS

The above and other aspects and features of the disclosure will become more apparent by describing in detail embodiments thereof with reference to the attached drawings, in which.

DETAILED DESCRIPTION

The invention will now be described more fully hereinafter with reference to the accompanying drawings, in which preferred embodiments of the invention are shown. This invention may however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the invention. Similarly, the second element could also be termed the first element.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Hereinafter, embodiments will be described with reference to the accompanying drawings.

Figure 1:
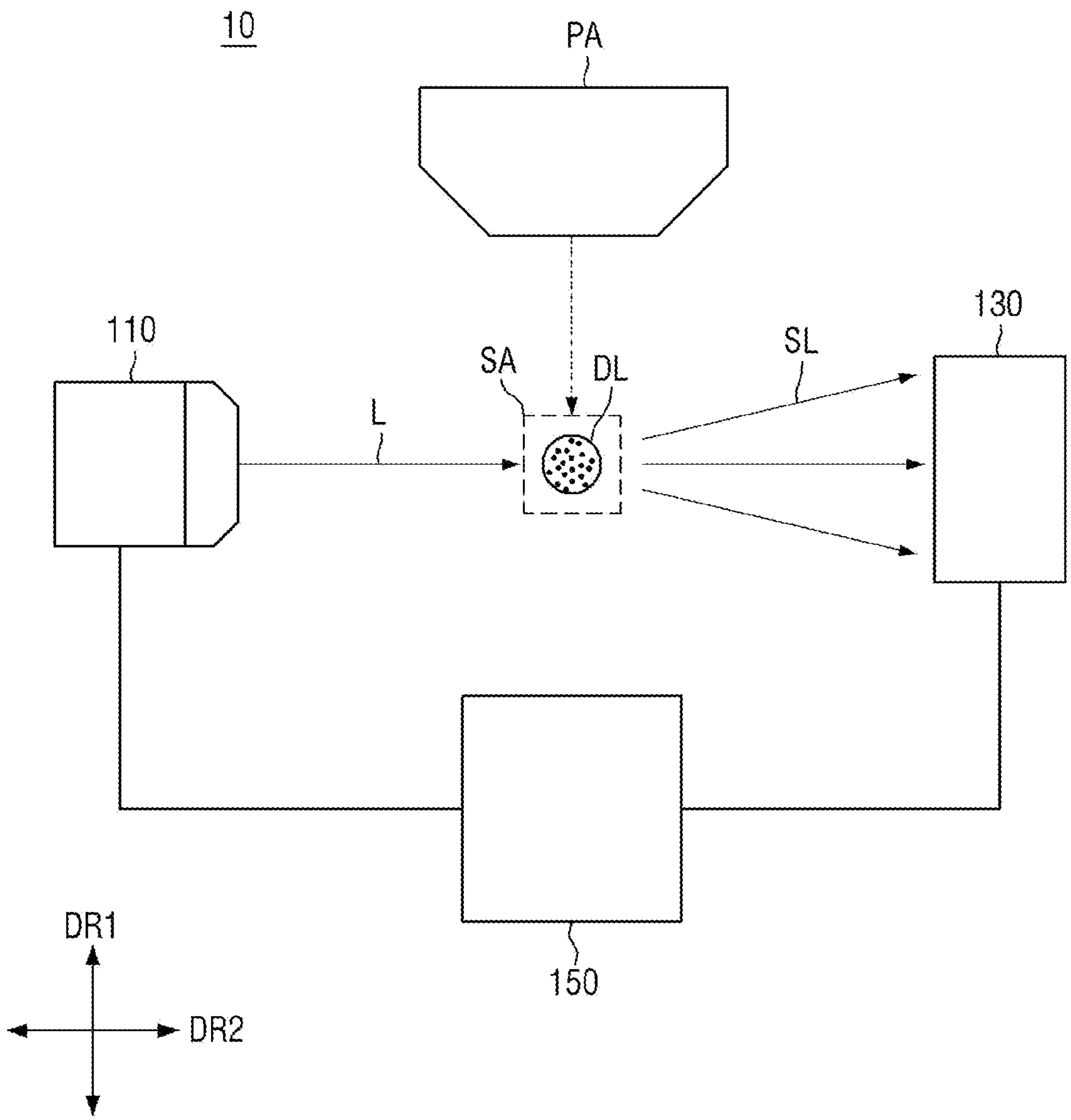
FIG. 1 is a schematic view illustrating an operation of an inkjet printing apparatus according to one embodiment.
Figure 2:
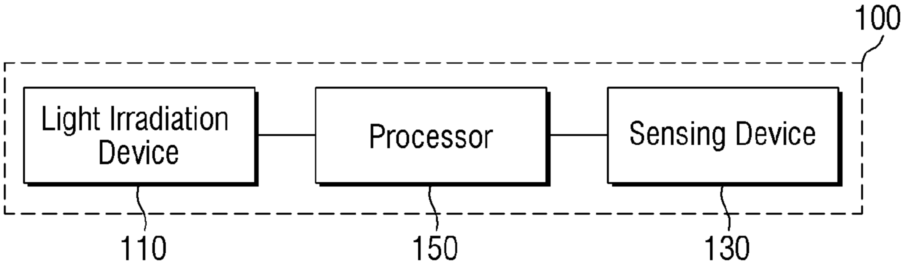
FIG. 2 is a schematic diagram illustrating a configuration of an ink concentration measuring device according to one embodiment.

FIG. 1 is a schematic view illustrating an operation of an inkjet printing apparatus according to one embodiment. FIG. 2 is a schematic diagram illustrating a configuration of an ink concentration measuring device according to one embodiment.

Referring to FIGS. 1 and 2, the inkjet printing apparatus 10 includes an inkjet head PA and an ink concentration measuring device 100. The inkjet head PA may eject an ink DL in which a plurality of particles ('PT' in FIG. 3) is dispersed through a nozzle (not illustrated). The ink DL ejected from the inkjet head PA may be sprayed onto a printing target object, and a layer or a pattern may be formed on the target object according to a kind of the material of the ink DL. In the drawing, only the inkjet head PA from which the ink DL is ejected and the ink concentration measuring device 100 are illustrated in the inkjet printing apparatus 10, but the inkjet printing apparatus 10 may further include devices other than the inkjet head PA.

The ink concentration measuring device 100 includes a light irradiation device 110, a sensing device 130, and a processor 150. The ink concentration measuring device 100 may acquire optical data for the ink DL that is a measurement target by using the light irradiation device 110 and the sensing device 130, and may sense the concentration of particles in the ink DL and a change in the concentration from the acquired data. The ink concentration measuring device 100 according to one embodiment may acquire data such as a change in the number of particles ('PT' in FIG. 3) included in the ink DL that is a measurement target, and a droplet volume and speed of the ink, and may check a change in the concentration of the dispersed particles per unit droplet of the ink from the data.

A measurement target of the ink concentration measuring device 100 according to one embodiment may be the ink DL in which the plurality of particles PT are dispersed, and may be the ink DL ejected from the inkjet head PA. In an embodiment, the inkjet head PA may include a plurality of nozzles or ejection units to simultaneously eject the ink DL from each nozzle. The ink DL ejected from the inkjet head PA may include a solvent ('SV' in FIG. 3) and the plurality of particles PT dispersed therein, and the ejected ink DL may be ejected on a printing object, for example, a target substrate to form a layer or pattern including the particles PT. In order to maintain the uniform quality of the layer or pattern formed by the ink DL, the number or concentration of the particles PT per unit droplet of the ink DL ejected from the inkjet head PA while the printing process is repeated is desirable to be uniform. In particular, the particles PT dispersed in the ink DL in a liquid state may be precipitated in the ink DL as the process is repeated, and the number of particles PT per unit droplet of the ink DL ejected from the inkjet head PA may vary.

The ink concentration measuring device 100 according to one embodiment may be embedded in the inkjet printing apparatus 10 including the inkjet head PA, and may sense the number of particles PT per unit droplet of the ink DL ejected from the inkjet head PA or a change in the concentration of the particles PT in the ink DL in real time while the printing process of the inkjet head PA is performed. The ink concentration measuring device 100 may provide feedback to the inkjet head PA based on the change in the concentration of the sensed particles PT to maintain a uniform concentration of the particles PT in the ink DL ejected from the inkjet head PA.

The light irradiation device 110 may irradiate the ink DL ejected from the inkjet head PA with light. The light irradiation device 110 may irradiate an irradiation area SA, which is set in the path through which the ink DL ejected from the inkjet head PA passes, with light L, and the light L irradiated from the light irradiation device 110 may be incident on the ink DL with passing through the irradiation area SA. The light irradiation device 110 may be disposed at a position capable of irradiating the light L on a path through which the ink DL ejected from the inkjet head PA passes. For example, when the ink DL is ejected from the inkjet head PA in the first direction DR1, the light irradiation device 110 may irradiate the light L in a direction different from the first direction DR1. For example, the light irradiation device 110 may be disposed to be spaced apart from a path through which the ink DL is ejected, in the second direction DR2 to irradiate the light L in the second direction DR2 perpendicular to the first direction DR1. The light irradiation device 110 may not be disposed in the first direction DR1 from the inkjet head PA from which the ink DL is ejected, and may be disposed to be spaced apart from the lower portion of the inkjet head PA in the second direction DR2. However, the disclosure is not limited thereto, and the disposition relationship between the light irradiation device 110 and the inkjet head PA may be different from that illustrated in the drawings.

The light L irradiated from the light irradiation device 110 to the ink DL may be reflected, refracted, or scattered by the ink DL, and exit light SL (hereinafter referred to as the "exit light from the ink DL") may be incident on the sensing device 130. The sensing device 130 may sense the amount, intensity, scattering intensity, and the like of the exit light SL from the ink DL.

The light irradiation device 110 and the sensing device 130 may be disposed at positions that are easy to irradiate the ink DL with light or sense the exit light SL. For example, when the ink DL is ejected from the inkjet head PA in the first direction DR1, the light irradiation device 110 may irradiate the light L in a direction different from the first direction DR1, and the sensing device 130 may be disposed opposite to the light irradiation device 110 with respect to a path through which the ink DL is ejected. For example, when the light irradiation device 110 is disposed to be spaced apart from the path through which the ink DL is ejected in one side in the second direction DR2, the sensing device 130 is disposed to be spaced apart from the path through which the ink DL is ejected in the other side in the second direction DR2, so that the light irradiation device 110 and the sensing device 130 may face each other. Although the drawing illustrates that the light irradiation device 110 and the sensing device 130 are disposed in opposite directions with respect to the ejection path of the ink DL, the disclosure is not limited thereto. In some embodiments, the ink concentration measuring device 100 may further include a device capable of reflecting or condensing the exit light SL from the ink DL in a specific direction, and in this case, the disposition of the sensing device 130 may vary.

The light L irradiated from the light irradiation device 110 may be scattered or refracted by the particles PT dispersed in the ink DL while passing through the ink DL. The scattering intensity of the light L incident on the ink DL may vary depending on the amount or concentration of the particles PT dispersed in the ink DL. When the light irradiation device 110 irradiates the light L in a predetermined intensity range or wavelength band, the intensity and scattering intensity of the exit light SL sensed by the sensing device 130 may vary depending on the number or concentration of particles dispersed in the ink DL.

Figure 3:
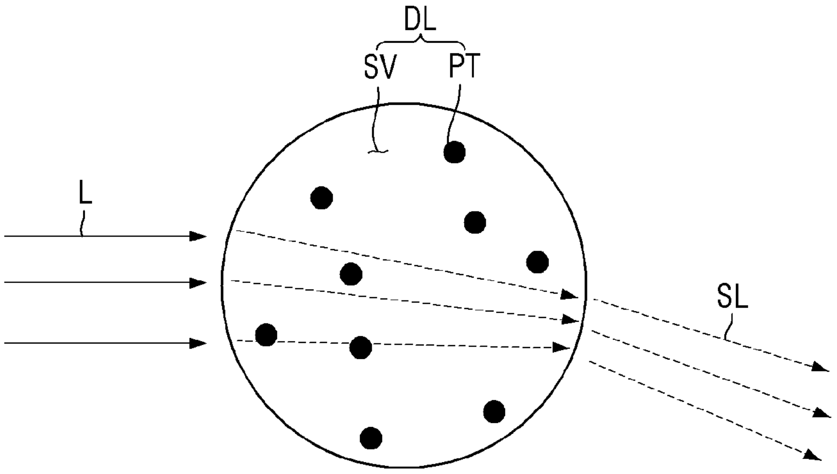
FIGS. 3 and 4 are schematic diagrams illustrating that light irradiated on particles dispersed in ink is scattered.
Figure 4:
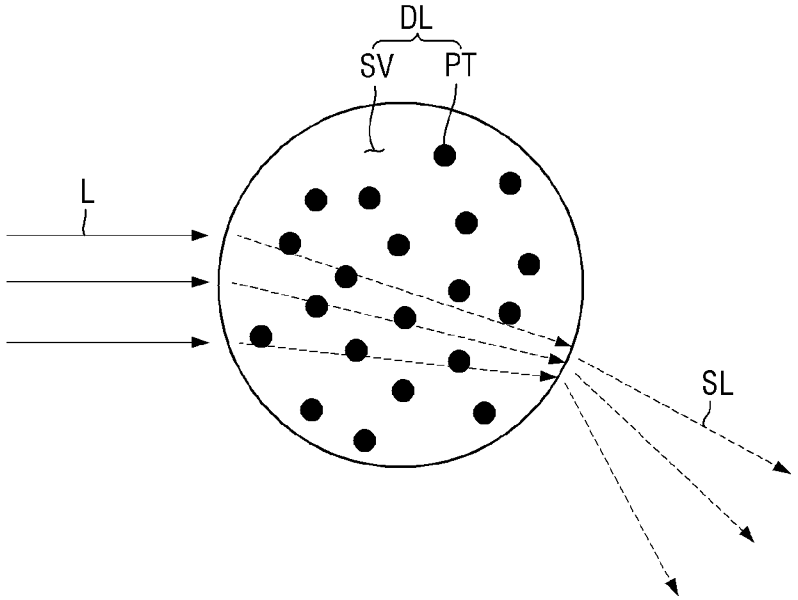

FIGS. 3 and 4 are schematic diagrams illustrating that light irradiated on particles dispersed in ink is scattered. Each of FIGS. 3 and 4 illustrate that the light L irradiated from the light irradiation device 110 is scattered by the ink DL. FIG. 3 exemplifies a case where the number of dispersed particles PT in the ink DL is smaller than that of the ink DL illustrated in FIG. 4.

Referring to FIGS. 3 and 4, the ink DL ejected from the inkjet head PA may be in a solution or colloidal state. The ink DL may include the solvent SV and a plurality of particles PT dispersed in the solvent SV. In one embodiment, the solvent SV may be acetone, water, alcohol, toluene, propylene glycol ("PG") or propylene glycol methyl acetate ("PGMA"), triethylene glycol monobutyl ether ("TGBE"), diethylene glycol monophenyl ether ("DGPE"), amide solvents, dicarbonyl solvents, diethylene glycol dibenzoate, tricarbonyl solvents, triethyl citrate, phthalate solvents, benzyl butyl phthalate, bis(2-ethylhexyl) phthalate, bis(2-ethylhexyl) isophthalate, ethyl phthalyl ethyl glycolate, or the like, but is not limited thereto. The plurality of particles PT may be inorganic particles or organic particles, such as quantum dots, scatterers, or inorganic semiconductor particles. The type of the particle PT dispersed and ejected in the ink DL may vary depending on the type of a layer or pattern to be formed using the inkjet head PA. In an embodiment, the particles PT dispersed and ejected by the inkjet printing apparatus 10 in the ink DL may be a quantum dot material such as titanium oxide ($TiO_2$), zirconium oxide ($ZrO_2$), aluminum oxide ($Al_2O_3$), indium oxide ($In_2O_3$), zinc oxide (ZnO), tin oxide ($SnO_2$), scatterers such as acrylic resin or urethane resin, group IV nanocrystals, group II-VI compound nanocrystals, group III-V compound nanocrystals, group IV-VI nanocrystals, or a combination thereof. Alternatively, when the particle PT is an inorganic semiconductor particle, the particle PT may be an inorganic semiconductor particle including gallium (Ga) as an inorganic light emitting element having a size of micrometers to nanometers.

Irrespective of the type of particles PT dispersed in the ink DL, the intensity or amount, and scattering intensity of the scattered light SL that has been incident on the ink DL may vary depending on the number or concentration of the particles PT. As the number of particles PT in the ink DL increases, the scattering intensity of the light L incident on the ink DL and the intensity and scattering intensity of the scattered light SL may increase. The ink concentration measuring device 100 may further include the processor 150 to sense or calculate a change in the concentration of the particles PT in the ink DL from the optical data obtained from the sensing device 130.

The processor 150 may receive data regarding the exit light SL incident on the sensing device 130. The processor 150 may sense a change in the concentration of the particles PT in the ink DL from the exit light data that has been inputted. The processor 150 may include an algorithm of selecting data on the exit light SL from the ink DL from the optical data acquired by the sensing device 130, and an algorithm of calculating a change in the concentration of the particles PT in the ink DL from the data on the exit light SL. For example, not only the exit light SL from the ink DL, but also the light L irradiated from the light irradiation device 110 according to the disposition of the sensing device 130 and the light irradiation device 110 may be incident on the sensing device 130. The processor 150 may select data on the exit light SL from the ink DL from the data of the light incident on the sensing device 130 based on data such as a traveling path, intensity, and scattering intensity of the light L irradiated from the light irradiation device 110. A change in the concentration of the particles PT in the ink DL may be sensed based on data on the exit light SL from the ink DL.

The concentration measurement of the particles PT in the ink DL performed by using the ink concentration measuring device 100 is to sense a change in the concentration of the particles PT in the ink DL while the eject process of the ink DL in the inkjet head PA is performed, and to maintain that the ink DL ejected by the inkjet head PA includes the uniform number of particles PT per unit droplet. In the above process, data that may be acquired by the sensing device 130 are data on the intensity and amount, and scattering intensity of the exit light SL from the ink DL. The ink concentration measuring device 100 may extract or calculate data on the number and concentration of the particles PT per unit droplet of the ink DL based on the acquired optical data, and determine whether a change in the concentration of the particles PT exceeds a reference value from the data, so that an algorithm of controlling the inkjet head PA may be performed. A description of a concentration measuring method performed by the ink concentration measuring device 100 will be described later with reference to other drawings.

On the other hand, the change data of the particles PT in the ink DL to be sensed by the ink concentration measuring device 100 is a change in the number of particles PT per unit droplet of the ink DL ejected from the inkjet head PA, and may be the concentration change data of the particles PT in the ink DL. A change in the concentration of the particles PT in the ink DL ejected from the inkjet head PA may be related to each of the droplet volume of the ink DL ejected once and the number of particles PT included in the ink DL ejected once. When the particles PT are precipitated in the ink DL flowing from the pipe included in the inkjet head PA, the number of particles PT in the ink DL ejected once may vary. In addition, when the volume of the ink DL ejected once is changed because foreign substances are formed in the nozzle from which the ink DL is ejected in the inkjet head PA, the number of particles PT ejected per unit time may also vary. These changes may result in a change in the concentration of the particles PT in the ink DL ejected once from the inkjet head PA, so that the quality of the layer or pattern formed using the inkjet head PA may not be uniform. The ink concentration measuring device 100 may sense a change in the concentration of the particles PT in the ink DL ejected once from the inkjet head PA in real time and provide feedback to the inkjet head PA.

The ink concentration measuring device 100 according to one embodiment may include a plurality of light irradiation devices 110 and a plurality of sensing devices 130, so that they may acquire different data about the ink DL. The ink concentration measuring device 100 may sense a change in the concentration of the particles PT per unit droplet of the ink DL through the volume and speed of the ink DL ejected once from the inkjet head PA and data correlated with the number of particles PT included in the ink DL, and may feed the change back to the inkjet head PA.

Figure 5:
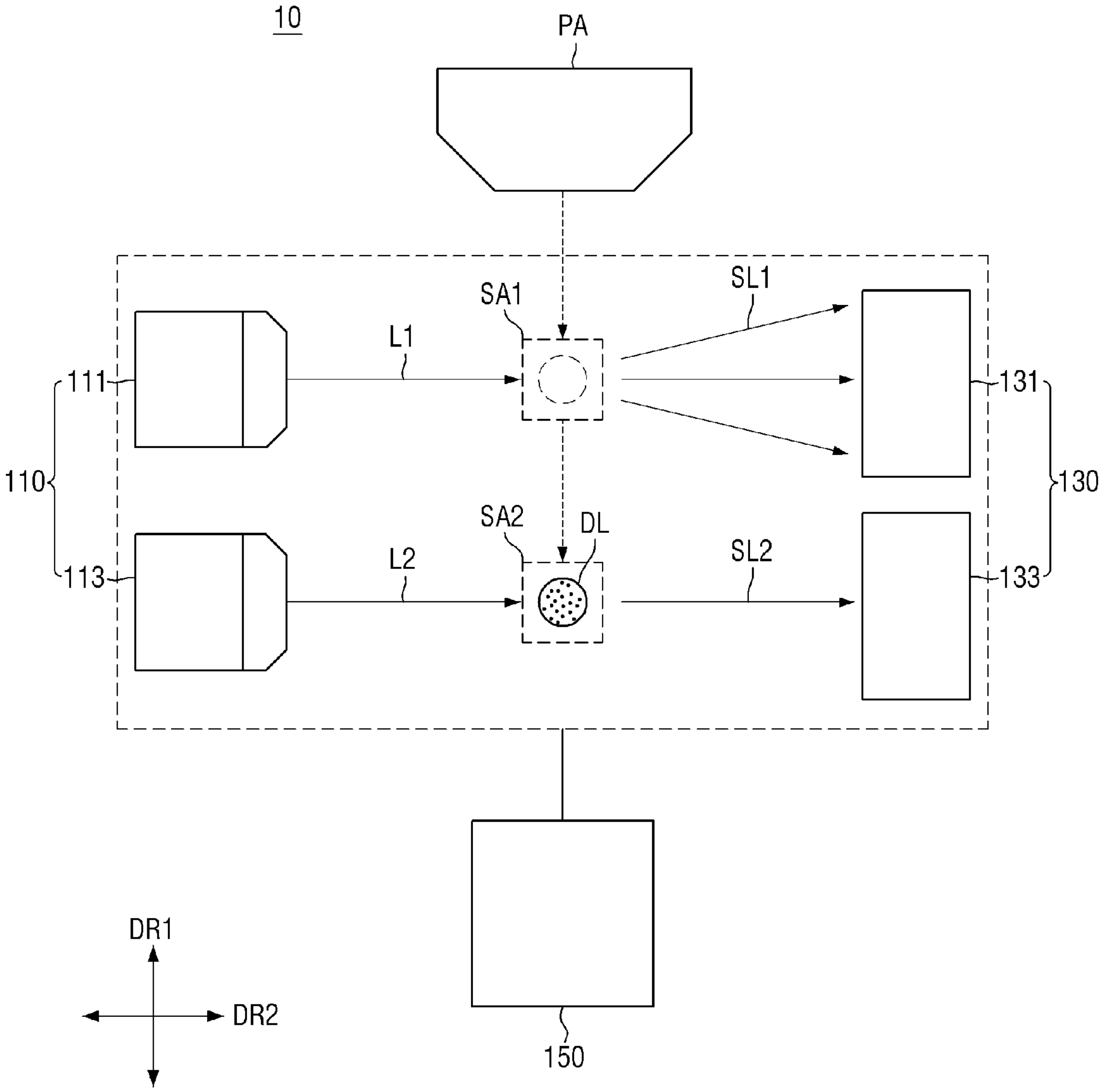
FIG. 5 is a schematic view illustrating an operation of an inkjet printing apparatus according to one embodiment.

FIG. 5 is a schematic view illustrating an operation of an inkjet printing apparatus according to one embodiment.

Referring to FIG. 5, the ink concentration measuring device 100 according to one embodiment may include a plurality of light irradiation devices 110 (111 and 113) irradiating different lights L1 and L2, and a plurality of sensing devices 130 (131 and 133) sensing the exit lights SL1 and SL2 from the ink DL by the lights L1 and L2 irradiated from the light irradiation devices 111 and 113, respectively. The light irradiation devices 110 and the sensing devices 130 that are different from each other may acquire data different from each other from the ink DL ejected from the inkjet head PA, respectively.

According to one embodiment, the light irradiation device 110 may include the first light irradiation device 111 and the second light irradiation device 113 that irradiate lights of different wavelength bands. The sensing device 130 may include the first sensing device 131 on which the first exit light SL1 irradiated from the first light irradiation device 111 and emitted from the ink DL is incident, and the second sensing device 133 on which the second exit light SL2 irradiated from the second light irradiation device 113 and emitted from the ink DL is incident. The first light irradiation device 111 and the first sensing device 131 may form a pair to acquire data related to the number of particles PT dispersed in the ink DL, and the second light irradiation device 113 and the second sensing device 133 may form a pair to acquire data related to the volume and speed of the ink DL ejected once.

As described above, the first light irradiation device 111 and the second light irradiation device 113 may be respectively disposed to irradiate the lights L1 and L2 in a direction different from the first direction DR1 in which the ink DL is ejected from the inkjet head PA. For example, each of the first light irradiation device 111 and the second light irradiation device 113 may be disposed to be spaced apart from a path through which the ink DL ejected from the inkjet head PA passes, in one side in the second direction DR2. The first light irradiation device 111 and the second light irradiation device 113 may irradiate the irradiation areas SA1 and SA2 set in a path through which the ink DL is ejected, respectively, with the lights L1 and L2 in the second direction DR2. The first light irradiation device 111 and the second light irradiation device 113 may be disposed on one side in the same direction from a path through which the ink DL is ejected and may be disposed parallel to each other in the first direction DR1, but the disclosure is not limited thereto. The first light irradiation device 111 and the second light irradiation device 113 may not be disposed parallel with each other, or may be disposed opposite to each other with respect to a path through which the ink DL is ejected in some embodiments.

The drawing exemplifies that the first light irradiation device 111 is disposed to be spaced apart from one side in the second light irradiation device 113 in the first direction DR1, and thus is disposed to be closer to the inkjet head PA than the second light irradiation device 113. In the irradiation areas SA1 and SA2 set in the area in which the ink DL is ejected, the first irradiation area SA1 that is irradiated with the first light L1 of the first light irradiation device 111 may be positioned closer to the inkjet head PA than the second irradiation area SA2 that is irradiated with the second light L2 of the second light irradiation device 113. However, the disclosure is not limited thereto, and in some embodiments, the second light irradiation device 113 may be disposed closer to the inkjet head PA than the first light irradiation device 111.

The plurality of sensing devices 130 may be disposed at positions on which the exit lights SL1 and SL2 from the ink DL may be incident. For example, the ink DL may be ejected from the inkjet head PA in the first direction DR1, the first light irradiation device 111 and the second light irradiation device 113 may irradiate the lights L1 and L2 in the second direction DR2, and the sensing devices 130 may be disposed opposite to the light irradiation device 110 with respect to a path through which the ink DL is ejected. The first sensing device 131 may be spaced apart from the first light irradiation device 111 in the second direction DR2 to be disposed opposite to a path through which the ink DL is ejected, and the second sensing device 133 may be spaced apart from the second light irradiation device 113 in the second direction DR2 to be disposed opposite to a path through which the ink DL is ejected. The first light irradiation device 111 and the second light irradiation device 113 may face the first sensing device 131 and the second sensing device 133 in the second direction DR2, respectively.

According to one embodiment, the first light irradiation device 111 and the second light irradiation device 113 may irradiate lights of different wavelength bands. For example, the first light irradiation device 111 may irradiate the first light L1 of a short wavelength band whose wavelength is short, 500 nanometers (nm) or less, and the second light irradiation device 113 may irradiate the second light L2 of a long wavelength band whose wavelength is long, about 1000 nm or more. The lights L1 and L2 irradiated to the ink DL may be refracted or scattered by the ink DL and the particles PT in the ink DL to be incident on the sensing device 130. Since the lights L1 and L2 may be more scattered by the particles PT as the wavelengths of the lights L1 and L2 are shorter, the first light L1 of a short wavelength band whose wavelength is shorter than a long wavelength band of the second light L2 may be advantageous in measuring the change in the number of particles PT in the ink DL. On the other hand, the second light L2 of the long wavelength band may be advantageous in measuring the size, volume, and speed of the ejected ink DL. In some embodiments, the first light L1 irradiated by the first light irradiation device 111 may be the first incident light incident on the ink DL, and the first exit light SL1 from the first light L1 emitted from the ink DL may be light scattered from the ink DL. The second light L2 irradiated by the second light irradiation device 113 may be the second incident light incident on the ink DL, and the second exit light SL2 from the second light L2 emitted from the ink DL may be light refracted by the ink DL. The ink concentration measuring device 100 may include the first light irradiation device 111 and the second light irradiation device 113 that emit the lights L1 and L2 of different wavelength bands, respectively, and may acquire data related to the size, volume, and speed of the ink DL ejected from the inkjet head PA and data related to the number of particles PT in the ink DL, respectively.

The first exit light SL1 generated from the first light L1, which is irradiated from the first light irradiation device 111, being scattered by the ink DL may be incident on the first sensing device 131, and data related to the number of particles PT in the ink DL may be acquired therefrom. The stronger the intensity and scattering intensity of the first exit light SL1 compared to the first light L1, the greater the number of particles PT in the ink DL may be. The smaller the intensity and scattering intensity of the first exit light SL1, the smaller the number of particles PT in the ink DL may be. The second exit light SL2 generated from the second light L2, which is irradiated from the second light irradiation device 113, being scattered by the ink DL may be incident on the second sensing device 133, and data related to the size, volume, and speed in the ink DL may be acquired therefrom.

The processor 150 of the ink concentration measuring device 100 may sense a change in the concentration of the particles PT in the ink DL based on the data on the exit lights SL1 and SL2 acquired from the first sensing device 131 and the second sensing device 133. The data on the exit lights SL1 and SL2 acquired by the first sensing device 131 and the second sensing device 133, respectively, may be data about light intensity, scattering intensity, an incident direction of the light, and the like. When the process of ejecting the ink DL from the inkjet head PA is performed, the processor 150 may process data acquired by irradiating the ink DL with light for each ejection process, may calculate the difference compared to an initial value or a preset value, and may calculate the concentration of the particles PT in the ink DL.

For example, when the data related to the concentration of the particles PT in the ink DL is set using data related to the size, volume, and speed, and the number of particles PT of the ink DL ejected in the initial ejection process of the inkjet head PA, the processor 150 may calculate data related to a change amount in the concentration of the particles PT in the ink DL from the data related to the size, volume, and speed, and the number of particles PT of the ink DL that changes for each ejection process. Alternatively, when numerical values related to the size, volume, and speed, and the number of particles PT desirable for the ink DL ejected once in the printing process of the inkjet head PA are stored in the processor 150, the processor 150 may calculate data related to the concentration of the particles PT in the ink DL by comparing the data on the ink DL acquired for each ejection process with the stored data. A more detailed description thereof will be described later with reference to other drawings.

The inkjet printing apparatus 10 according to one embodiment may include the ink concentration measuring device 100 that senses in real time the concentration of the particles PT in the ink DL ejected from the inkjet head PA, thereby uniformly maintaining the concentration of the particles PT in the ink DL during the repeated printing process. When a layer or pattern including the particles PT is formed by using the inkjet printing apparatus 10, the product formed by the printing process has an advantage in that the quality of the layer and pattern may be uniformly maintained.

Figure 6:
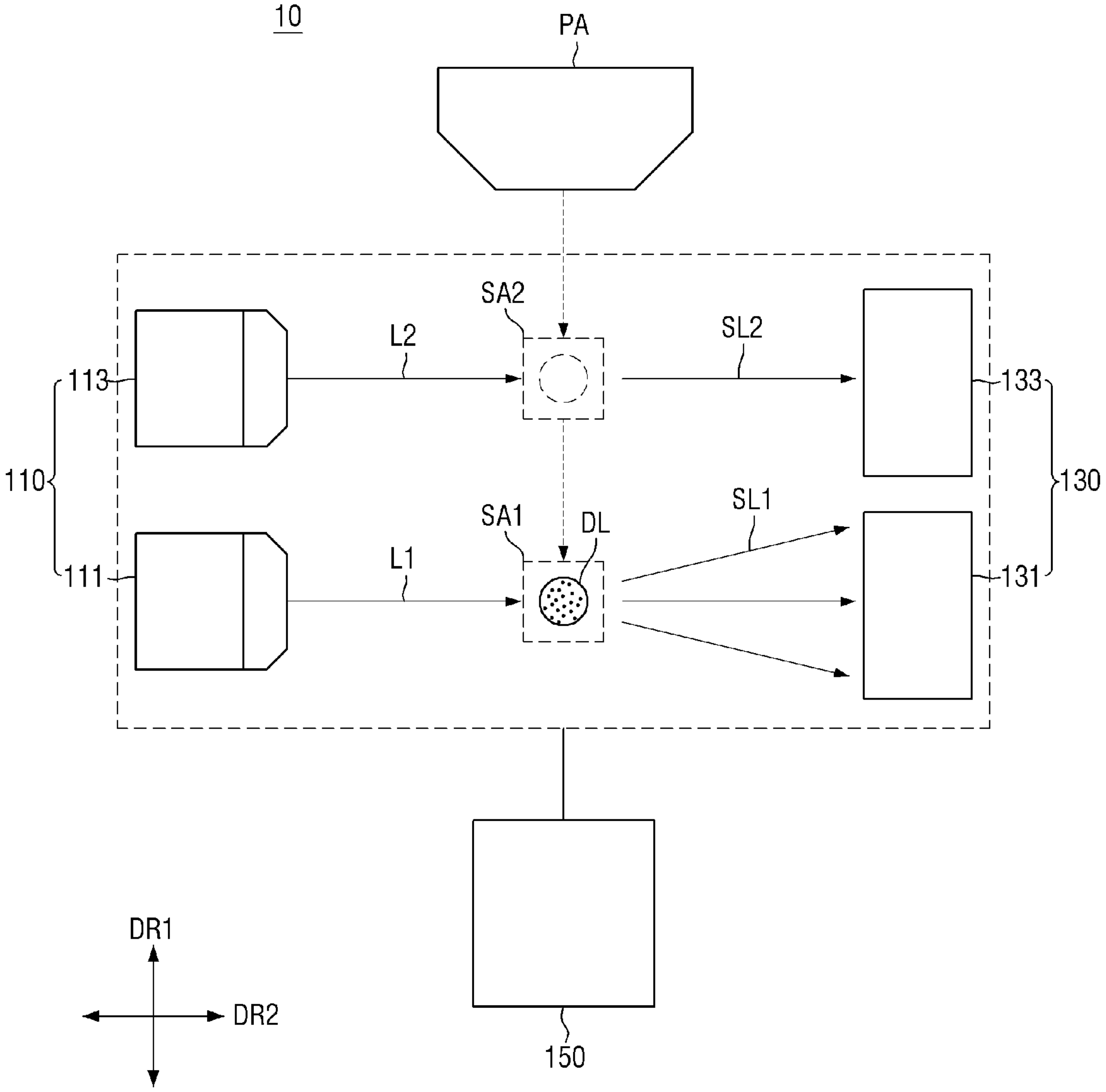
FIG. 6 is a schematic view illustrating an operation of an inkjet printing apparatus according to another embodiment.

FIG. 6 is a schematic view illustrating an operation of an inkjet printing apparatus according to another embodiment.

Referring to FIG. 6, in the inkjet printing apparatus 10 according to one embodiment, the second light irradiation device 113 and the second sensing device 133 may be disposed more adjacent to the inkjet head PA than the first light irradiation device 111 and the first sensing device 131. When the ink DL is ejected in the first direction DR1 of the inkjet head PA, and the irradiation areas SA1 and SA2 that the light irradiation device 110 irradiates with the lights L1 and L2, respectively, are positioned in the ejection path of the ink DL, in the embodiment, the second irradiation area SA2 may be positioned closer to the inkjet head PA than the first irradiation area SA1. When the ink concentration measuring device 100 of the inkjet printing apparatus 10 includes the first light irradiation device 111 and the second light irradiation device 113 and acquires various data for the ink DL by irradiating the lights L1 and L2 of different wavelength bands, their relative disposition may not be particularly limited. The embodiment is the same as the embodiment of FIG. 5 except that the relative disposition between the second light irradiation device 113 and the second sensing device 133, and the first light irradiation device 111 and the first sensing device 131 is different.

As the second light irradiation device 113 and the second sensing device 133 are disposed closer to the inkjet head PA, the inkjet printing apparatus 10 has the advantage of being able to more easily acquire data related to the size, volume, and speed of the ink DL ejected from the ink concentration measuring device 100. After the ink DL is ejected from the inkjet head PA, the physical properties of the droplet of the ink DL may be changed due to the printing target object, or other external factors while seated on the target substrate. Data related to the number of particles PT in the ink DL that may be acquired from the first light irradiation device 111 and the first sensing device 131 may be almost constant, independent of the physical properties of the droplet of the ink DL after being ejected from the inkjet head PA. Accordingly, in the inkjet printing apparatus 10, the second light irradiation device 113 and the second sensing device 133 may be disposed closer to the inkjet head PA to acquire the second exit light SL2, which is data on the size, volume, and speed of the ink DL immediately after being ejected from the inkjet head PA.

Figure 7:
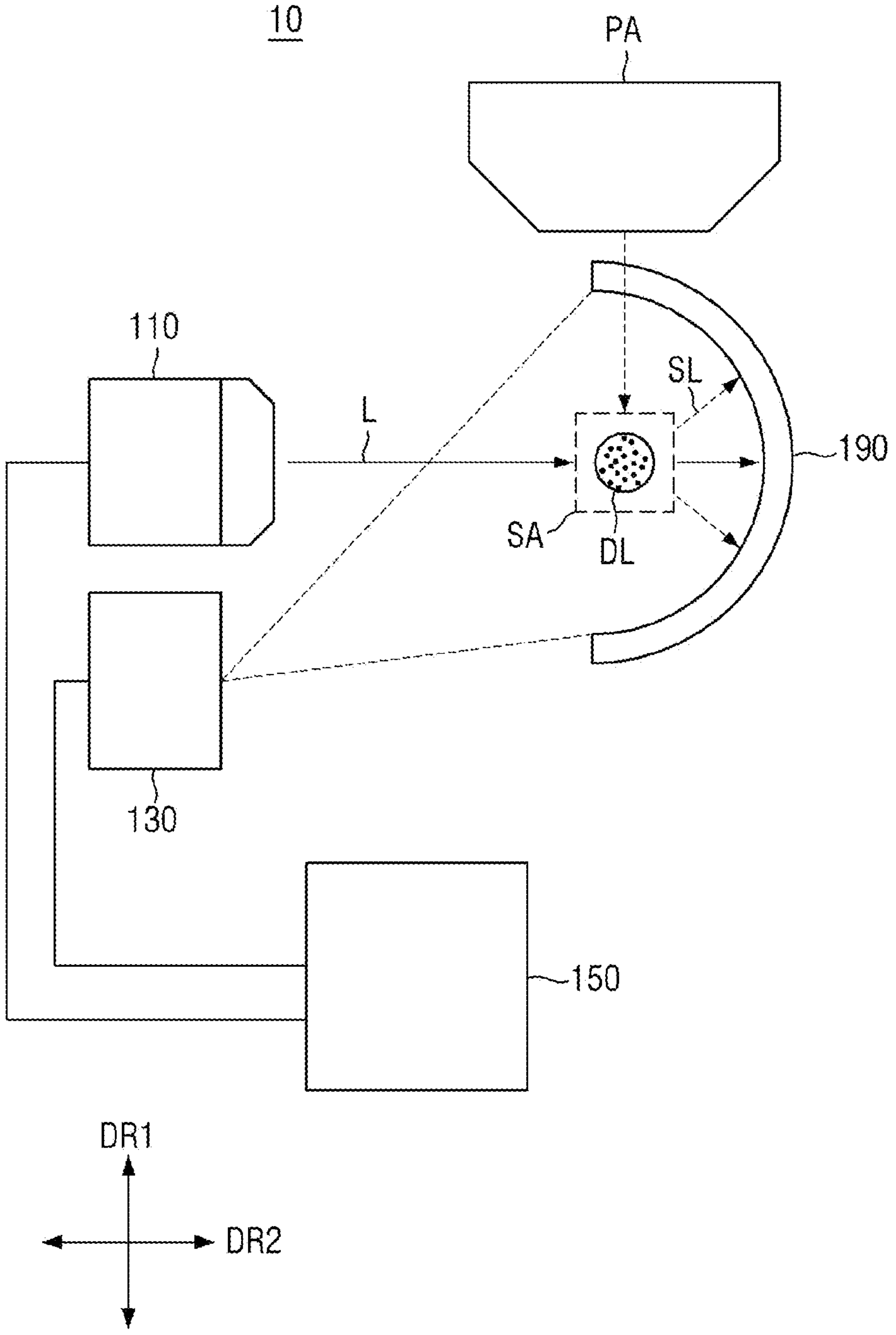
FIG. 7 is a schematic view illustrating an operation of an inkjet printing apparatus according to still another embodiment.
Figure 8:
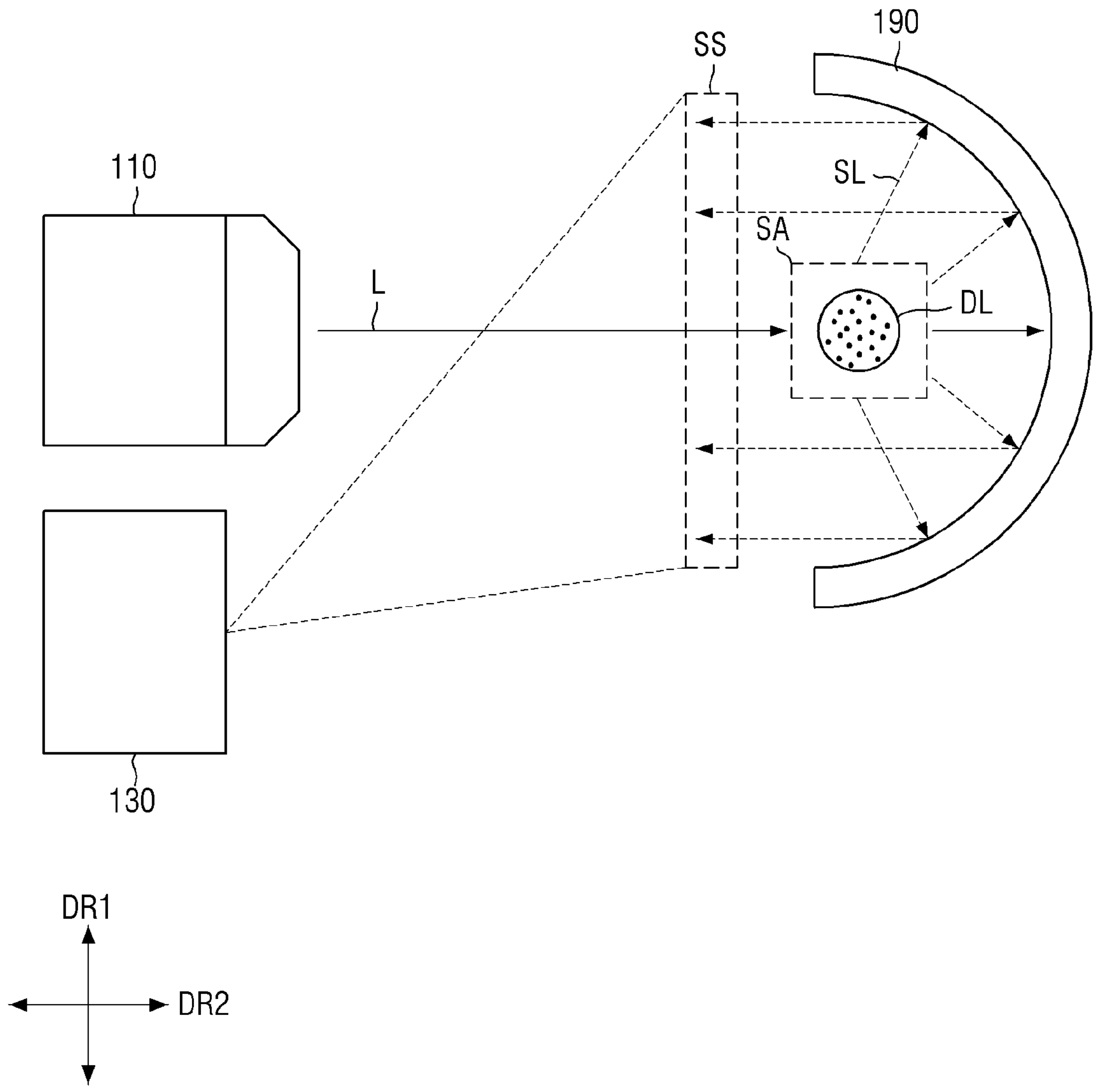
FIG. 8 is a schematic view illustrating the propagation of light reflected by a reflector in the inkjet printing apparatus of FIG. 7.

FIG. 7 is a schematic view illustrating an operation of an inkjet printing apparatus according to still another embodiment. FIG. 8 is a schematic view illustrating the propagation of light reflected by a reflector in the inkjet printing apparatus of FIG. 7.

Referring to FIGS. 7 and 8, in the inkjet printing apparatus 10 according to one embodiment, the ink concentration measuring device 100 may further include a reflector 190 capable of condensing the exit light SL, which is from the ink DL by the irradiation from the light irradiation device 110, to a specific area.

The reflector 190 may have a semicircular shape with a curved outer surface, and may surround an ejection path through which the ink DL ejected from the inkjet head PA passes. The ink DL ejected from the inkjet head PA may be ejected to pass through the center of curvature of the reflector 190, and the light L irradiated from the light irradiation device 110 may be scattered or refracted in the ink DL to be incident on the reflector 190 as the exit light SL. The reflector 190 may include a material having high reflectivity to reflect the exit light SL from the ink DL in a direction opposite to the incident direction of the light L.

The reflector 190 may be disposed at a position capable of reflecting the exit light SL from the ink DL. For example, in the embodiment in which the light irradiation device 110 is disposed to be spaced apart from the ejection path of the ink DL in the second direction DR2, the reflector 190 may be formed to be curved toward the opposite side of the light irradiation device 110 with respect to the ejection path of the ink DL. The reflector 190 may be disposed so that the center of curvature lies on the ejection path of the ink DL, and may have a convex shape in a direction opposite to the direction in which the light irradiation device 110 is disposed with respect to the ejection path of the ink DL. The exit light SL from the ink DL, which is irradiated from the light irradiation device 110, may proceed toward a concave inside of the reflector 190.

In addition, the exit light SL may be reflected from the reflector 190 in a direction in which the light irradiation device 110 is disposed. Unlike the embodiment of FIGS. 1 and 5, the direction in which the exit light SL is directed is the direction in which the light irradiation device 110 is disposed, and thus the sensing device 130 according to one embodiment may be disposed in the same direction as the light irradiation device 110 with respect to the ejection path of the ink DL. The reflector 190 may reflect the exit light SL from the ink DL toward an arbitrary area set in the portion in which the light irradiation device 110 is disposed, for example, a sensing area SS, and the sensing device 130 may sense the light SL incident on the sensing area SS. The light irradiation device 110 and the sensing device 130 may not face each other in the second direction DR2, but may be disposed in parallel on one side from the ejection path of the ink DL.

The reflector 190 may reflect the light L irradiated from the light irradiation device 110 and the exit light SL from the ink DL toward the sensing area SS, and thus may induce a condensing effect of the light. The sensing device 130 may acquire data on the exit light SL from the ink DL by sensing only the light incident to the sensing area SS to which the light reflected by the reflector 190 is directed. The ink concentration measuring device 100 of the inkjet printing apparatus 10 further includes the reflector 190 and has an advantage of being capable of improving the accuracy and precision of data acquired by the sensing device 130.

Figure 9:
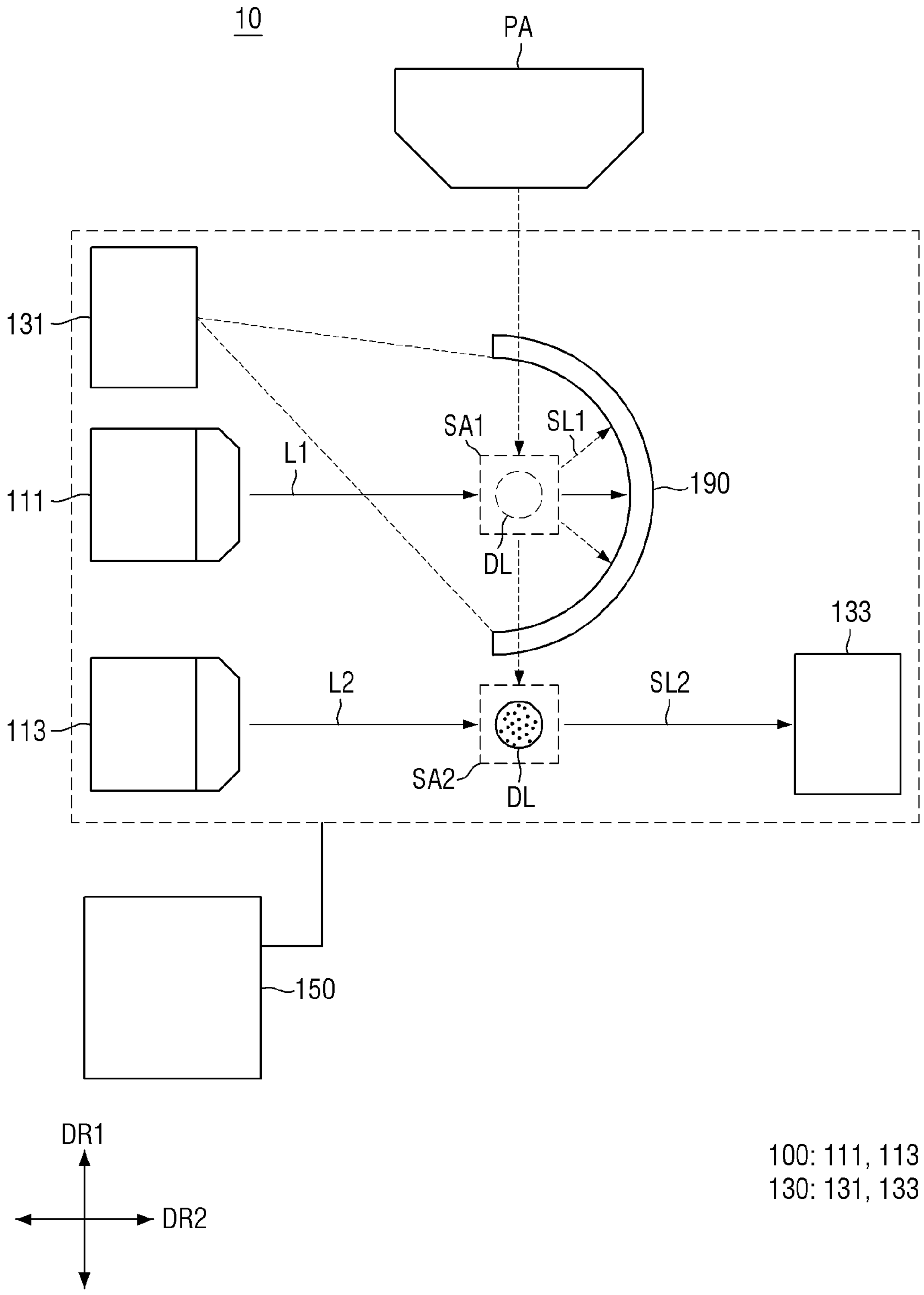
FIGS. 9 and 10 are schematic views illustrating an operation of an inkjet printing apparatus according to another embodiment.
Figure 10:
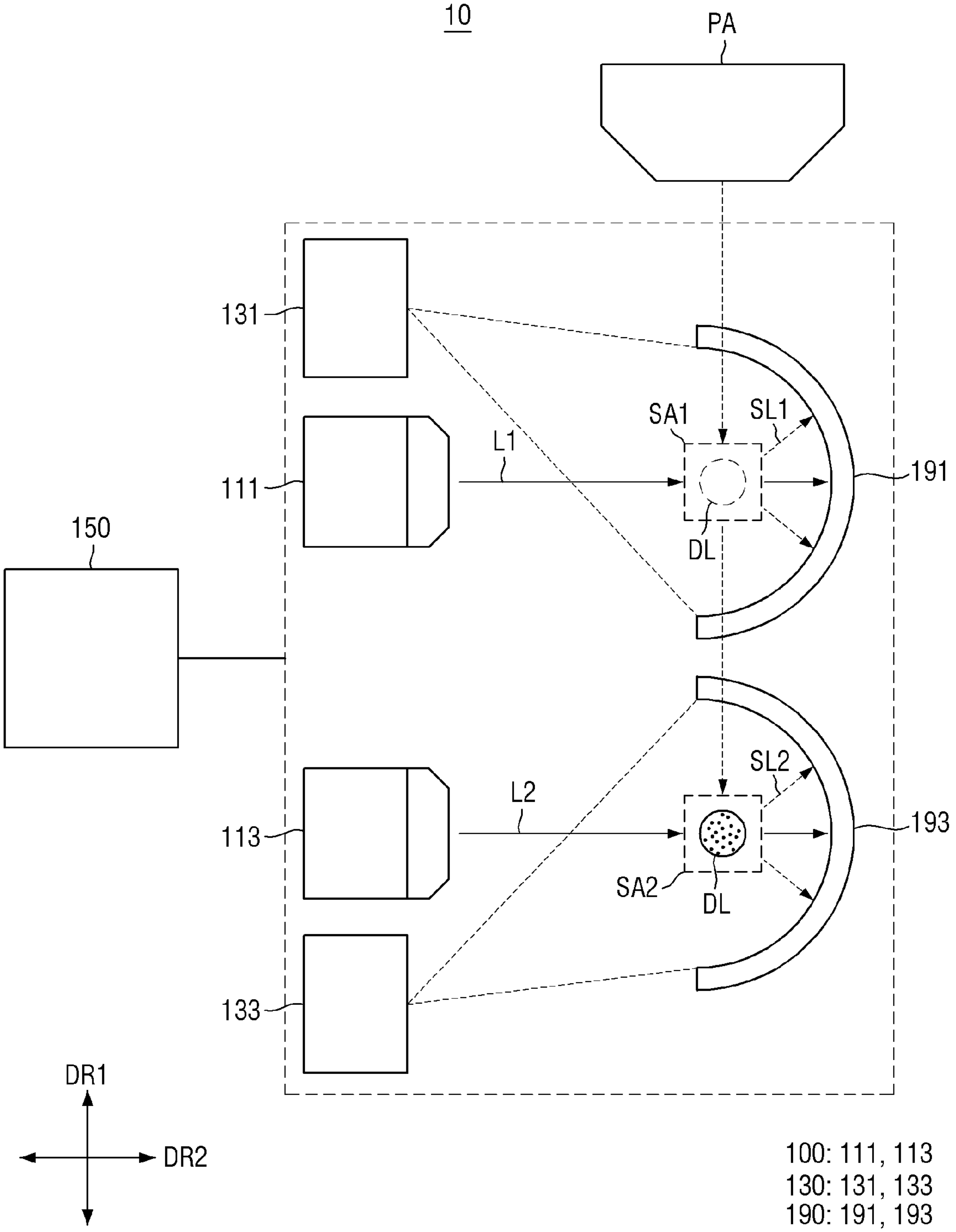

FIGS. 9 and 10 are schematic views illustrating an operation of an inkjet printing apparatus according to another embodiment.

Referring to FIGS. 9 and 10, in the inkjet printing apparatus 10 according to one embodiment, the ink concentration measuring device 100 may include at least one reflector 190 (191 and 193) to improve the accuracy and precision of data acquired by the first sensing device 131 and the second sensing device 133.

In the embodiment of FIG. 9, the ink concentration measuring device 100 may include one reflector 190 and may be disposed to face the first light irradiation device 111. The first light irradiation device 111 and the reflector 190 may be disposed to oppose and face each other in the second direction DR2, and the first sensing device 131 may be disposed in parallel with the first light irradiation device 111 on one side from the ejection path of the ink DL without facing each other in the second direction DR2. On the other hand, the second light irradiation device 113 and the second sensing device 133 may be disposed to face each other in the second direction DR2 as in the embodiment of FIG. 6.

In the embodiment of FIG. 10, the ink concentration measuring device 100 may include a first reflector 191 and a second reflector 193. The first reflector 191 may be disposed to face the first light irradiation device 111, and the second reflector 193 may be disposed to face the second light irradiation device 113. The first sensing device 131 and the first light irradiation device 111 may be disposed in parallel on one side from the ejection path of the ink DL without facing each other in the second direction DR2. The second sensing device 133 and the second light irradiation device 113 may be disposed in parallel on one side from the ejection path of the ink DL without facing each other in the second direction DR2.

Figure 11:
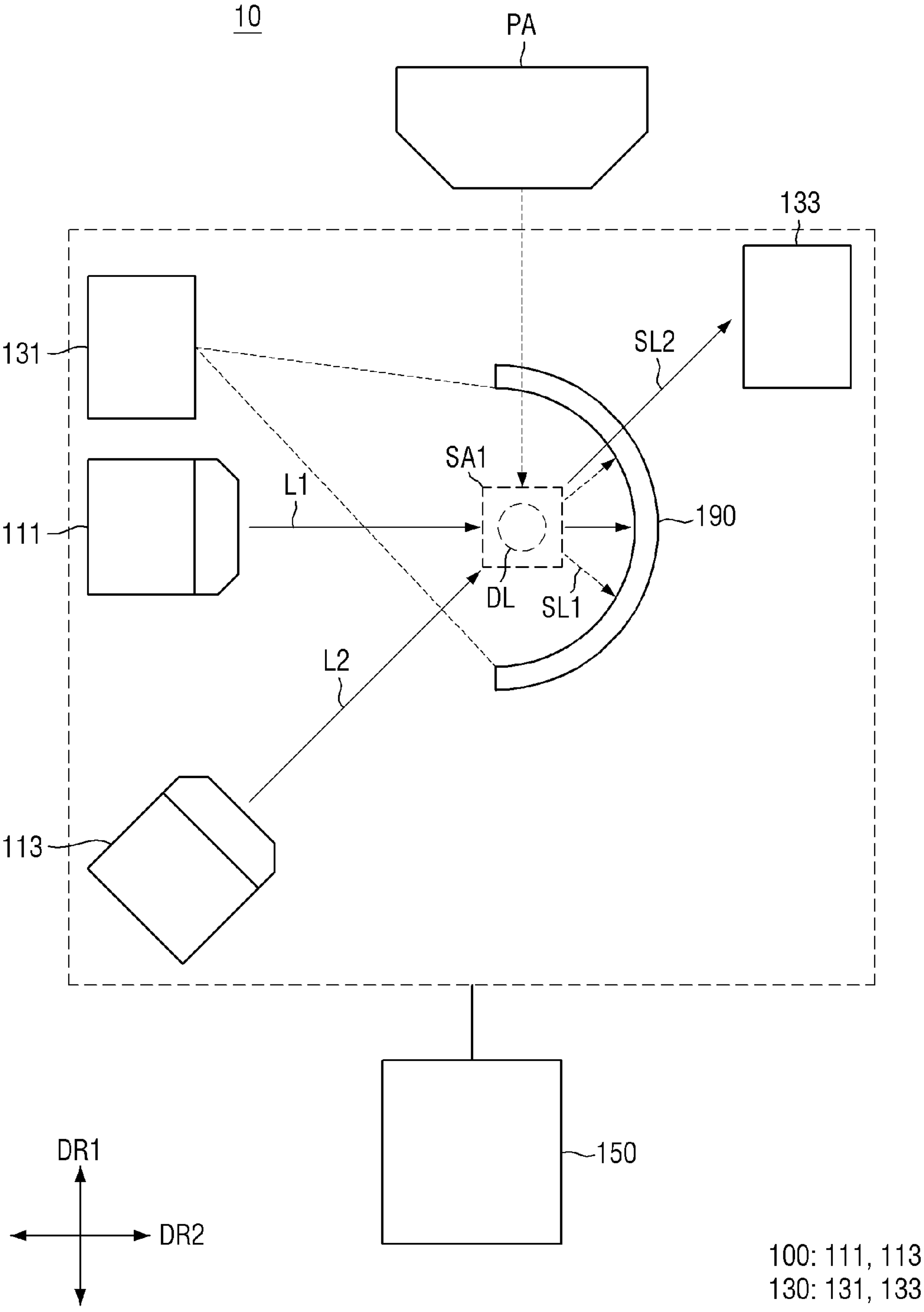
FIG. 11 is a schematic view illustrating an operation of an inkjet printing apparatus according to another embodiment.

FIG. 11 is a schematic view illustrating an operation of an inkjet printing apparatus according to another embodiment.

Referring to FIG. 11, in the inkjet printing apparatus 10 according to one embodiment, the first light irradiation device 111 and the second light irradiation device 113 may irradiate the same irradiation area SA with the lights L1 and L2, respectively. When the first light irradiation device 111 and the second light irradiation device 113 irradiate the lights L1 and L2, respectively, to be directed in different directions, the different sensing devices 131 and 133 may sense the different exit lights SL1 and SL2, respectively, although the first light irradiation device 111 and the second light irradiation device 113 irradiate the same irradiation area SA with the lights. When one light irradiation device 111 irradiates the ink DL with light by bypassing the light propagation path of the other light irradiation device 113, the different light irradiation devices 111 and 113 may simultaneously irradiate the ink DL positioned in the same area with the lights, and the different sensing devices 131 and 133 may separately acquire data of the exit lights SL1 and SL2.

For example, when the ink DL is ejected from the inkjet head PA and is positioned in the arbitrary irradiation area SA, the first light irradiation device 111 may irradiate the first light L1 in the second direction DR2. The first light L1 irradiated in the second direction DR2 may be scattered from the ink DL and may be directed toward the reflector 190. When the first exit light SL1 reflected from the reflector 190 is incident on a sensing area (not illustrated), the first sensing device 131 may sense the first exit light SL1. The first sensing device 131 may be disposed in parallel with the first light irradiation device 111 on one side of the ejection path of the ink DL. The first light L1 irradiated from the first light irradiation device 111 may be a laser light having a short wavelength, and data on the first exit light SL1 acquired from the first sensing device 131 may be data related to the number of particles PT in the ink DL.

Unlike the embodiment of FIG. 5, when the ink DL is ejected from the inkjet head PA and is positioned in the arbitrary irradiation area SA, the second light irradiation device 113 may irradiate the second light L2 in a direction between the first direction DR1 and the second direction DR2. The second light L2 irradiated from the second light irradiation device 113 may not be directed toward the reflector 190, but may be directed toward the second sensing device 133 disposed to face the second light irradiation device 113.

When the second light irradiation device 113 is disposed to be spaced apart from the first light irradiation device 111 in the first direction DR1 and irradiates the irradiation area SA positioned in the second direction DR2 of the first light irradiation device 111 with the second light L2, the second light L2 may be directed from the lower side of the first light irradiation device 111 (e.g., the other side in the first direction DR1) to the upper side of the reflector 190 (e.g., one side in the first direction DR1). The second sensing device 133 may be disposed to face the second light irradiation device 113 with respect to the irradiation area SA, and may be disposed on the upper side of the reflector 190 (one side in the first direction DR1). The second light L2 directed toward the irradiation area SA may not be directed to the reflector 190, but may be directed to the second sensing device 133. The second light L2 irradiated from the second light irradiation device 113 may be a laser light having a long wavelength, and data on the second exit light SL2 acquired from the second sensing device 133 may be data related to the size, volume, and speed of the ink DL.

As the first light irradiation device 111 irradiates the reflector 190 with the first light L1, the first light irradiation device 111 and the first sensing device 131 may be disposed in parallel on one side of the ejection path of the ink DL. On the other hand, as the second light irradiation device 113 irradiates the second light L2 in an oblique direction so as not to be directed to the reflector 190, the second light irradiation device 113 and the second sensing device 133 may be disposed opposite to each other with respect to the ejection path of the ink DL and may face each other. In the inkjet printing apparatus 10 according to the embodiment, the different light irradiation devices 111 and 113 may simultaneously irradiate the ink DL placed in the same irradiation area SA with the lights L1 and L2 and may acquire data of the exit lights SL1 and SL2. The light irradiation devices 111 and 113 and the sensing devices 131 and 133 may have corresponding dispositions.

Hereinafter, a method of printing the ink using the inkjet printing apparatus 10 will be described with further reference to other drawings.

Figure 12:
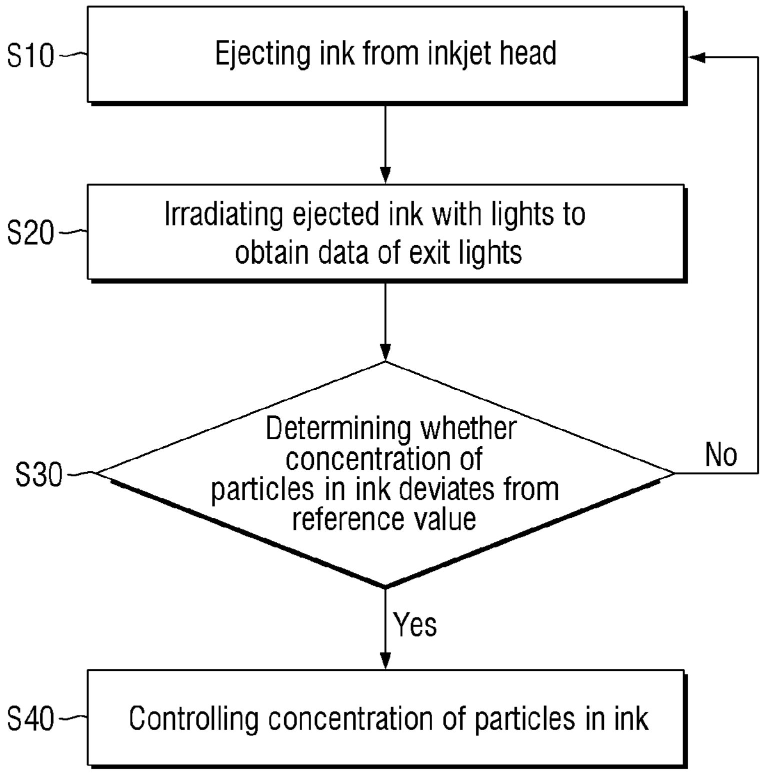
FIG. 12 is a flowchart illustrating a method of printing the ink using an inkjet printing apparatus according to one embodiment.

FIG. 12 is a flowchart illustrating a method of printing the ink using an inkjet printing apparatus according to one embodiment.

Referring to FIG. 12, a method of printing the ink using the inkjet printing apparatus 10 according to one embodiment includes ejecting the ink DL from the inkjet head PA (step S10), irradiating the ejected ink DL with the lights L1 and L2 to obtain data of the exit lights SL1 and SL2 (step S20), and determining whether the concentration of the particles PT in the ink DL deviates from the reference value (step S30). In the ink concentration measuring device 100, the processor 150 senses the concentration and a change in the concentration of the particles PT in the ink DL, and according to whether the sensed value of the concentration deviates from the reference value, the printing process may proceed with the ejecting the ink DL from the inkjet head PA (step S10), or may include controlling the concentration of the particles PT in the ink DL to be ejected by feeding the current concentration back to the inkjet head PA (step S40).

The inkjet printing apparatus 10 may be used to perform an inkjet printing process in a process of forming a layer or pattern including the particles PT on a printing target product, for example, a target substrate. The inkjet printing apparatus 10 may eject the ink DL in which the particles PT are dispersed from the inkjet head PA on the target substrate, and a post-treatment process may be performed on the ink DL seated on the target substrate to form a layer or pattern including the particles PT.

The method of printing the ink according to one embodiment may include sensing a change in the concentration of the particles PT included in the ink DL or measuring the concentration during a printing process of forming a layer or a pattern including the particles PT. As in the above-described embodiments, the inkjet printing apparatus 10 including the ink concentration measuring device 100 may sense the concentration of the particles PT in the ink DL by measuring a change in the droplets and the particles PT of the ink DL ejected from the inkjet head PA, and may maintain the uniform concentration of the particles PT in the ink DL to be ejected by feeding back the concentration to the inkjet head PA. Hereinafter, a method of printing the ink utilizing the inkjet printing apparatus 10 will be described with further reference to other drawings.

FIGS. 13 to 16 are schematic views sequentially illustrating a method of printing the ink according to one embodiment. FIGS. 13 to 16 sequentially illustrate a method of printing the ink using the inkjet printing apparatus 10 of FIG. 9.

Figure 13:
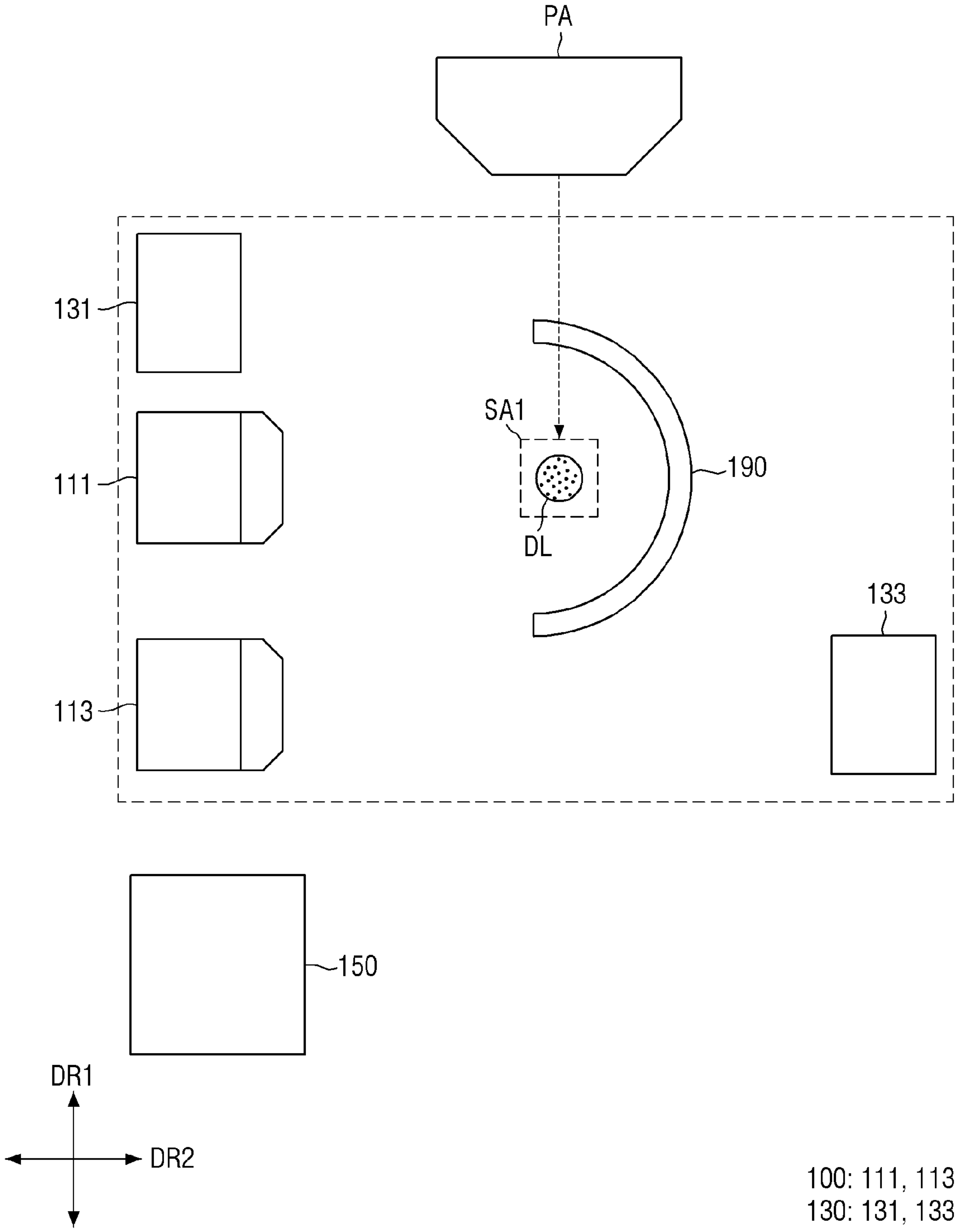
FIGS. 13 to 16 are schematic views sequentially illustrating a method of printing the ink according to one embodiment.

First, referring to FIG. 13, the ink DL is ejected from the inkjet head PA of the inkjet printing apparatus 10 (step S10). As described above, the ink DL may include a solvent SV and the plurality of particles PT dispersed in the solvent SV. Although not illustrated in the drawings, the ink DL may be accommodated in an ink storage unit included in the inkjet printing apparatus 10, and then may be injected into the inkjet head PA through a pipe. The ink DL may be ejected through a plurality of nozzles included in the inkjet head PA, and may be sprayed onto a target substrate (not illustrated) that is a printing target object.

The ink DL may be ejected from the inkjet head PA in the first direction DR1. The ink DL may be ejected from the inkjet head PA, pass through the irradiation areas SA1 and SA2 irradiated with the light of the light irradiation device 110 (111 and 113) of the ink concentration measuring device 100, and be sprayed onto the target substrate.

Figure 14:
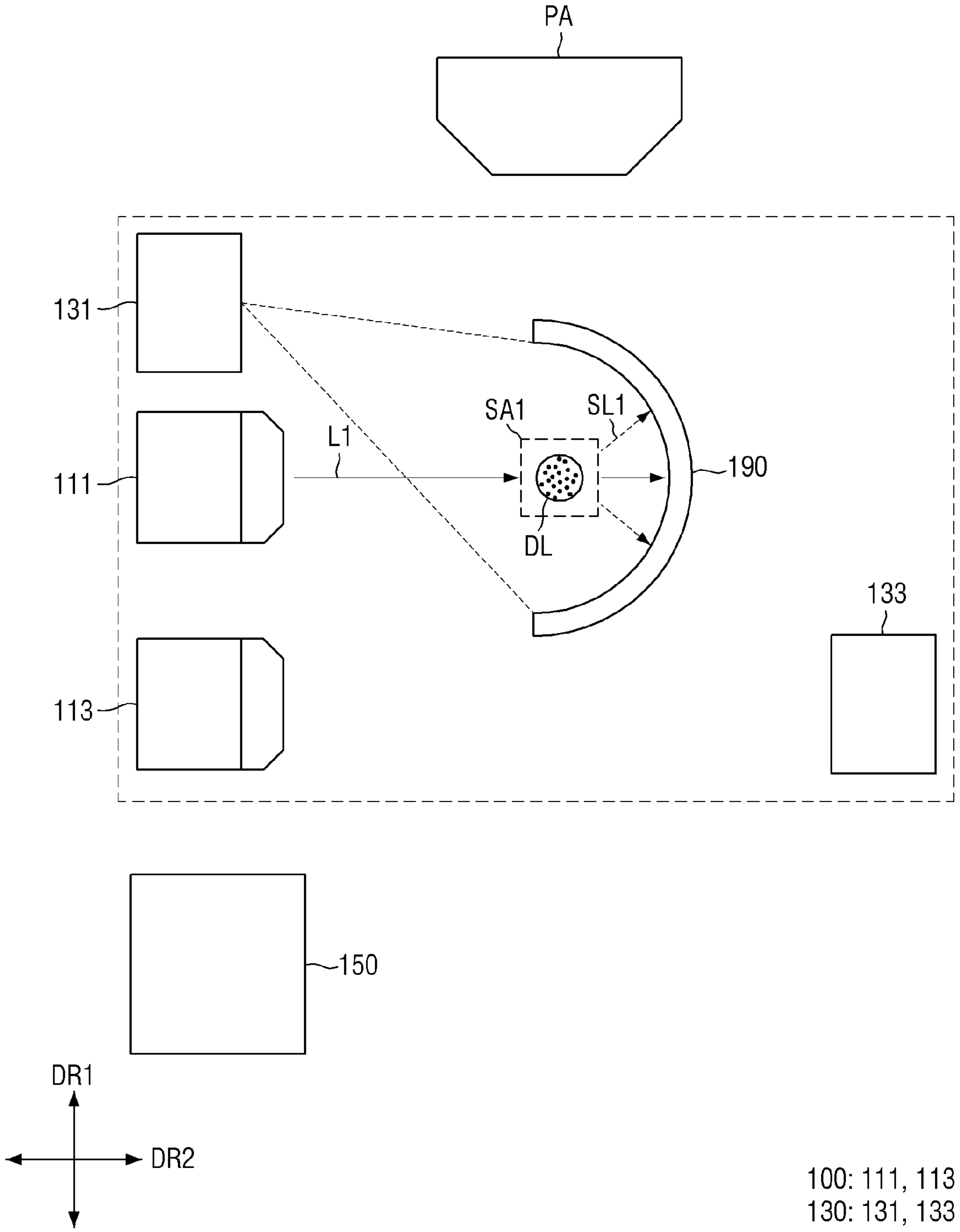

Next, referring to FIG. 14, when the ink DL ejected from the inkjet head PA passes through the first irradiation area SA1, the first light irradiation device 111 may irradiate the first irradiation area SA1 with the first light L1, and the first sensing device 131 may obtain data on the first exit light SL1 scattered from the ink DL (step S20). In the embodiment in which the ink concentration measuring device 100 of the inkjet printing apparatus 10 includes one reflector 190 facing the first light irradiation device 111, the ink DL is ejected to pass through the center of curvature of the reflector 190, and the first light irradiation device 111 may irradiate the first light L1 when the ink DL is positioned in the first irradiation area SA1.

In some embodiments, the center of curvature of the reflector 190 may overlap the first irradiation area SA1, and when the ink DL is placed at the center of curvature of the reflector 190, the first light L1 may be irradiated. The first light L1 irradiated from the first light irradiation device 111 may be scattered by the ink DL and may be directed toward the reflector 190 as the first exit light SL1. The reflector 190 may reflect the first exit light SL1, and the first sensing device 131 may sense the first exit light SL1 reflected from the reflector 190.

Data of the first exit light SL1 sensed by the first sensing device 131 may be data related to the number of particles PT in the ink DL. When the number of particles PT in the ink DL is large, the intensity and scattering intensity of the first exit light SL1 may be large, and when the number of particles PT in the ink DL is small, the intensity and scattering intensity of the first exit light SL1 may be small.

Figure 15:
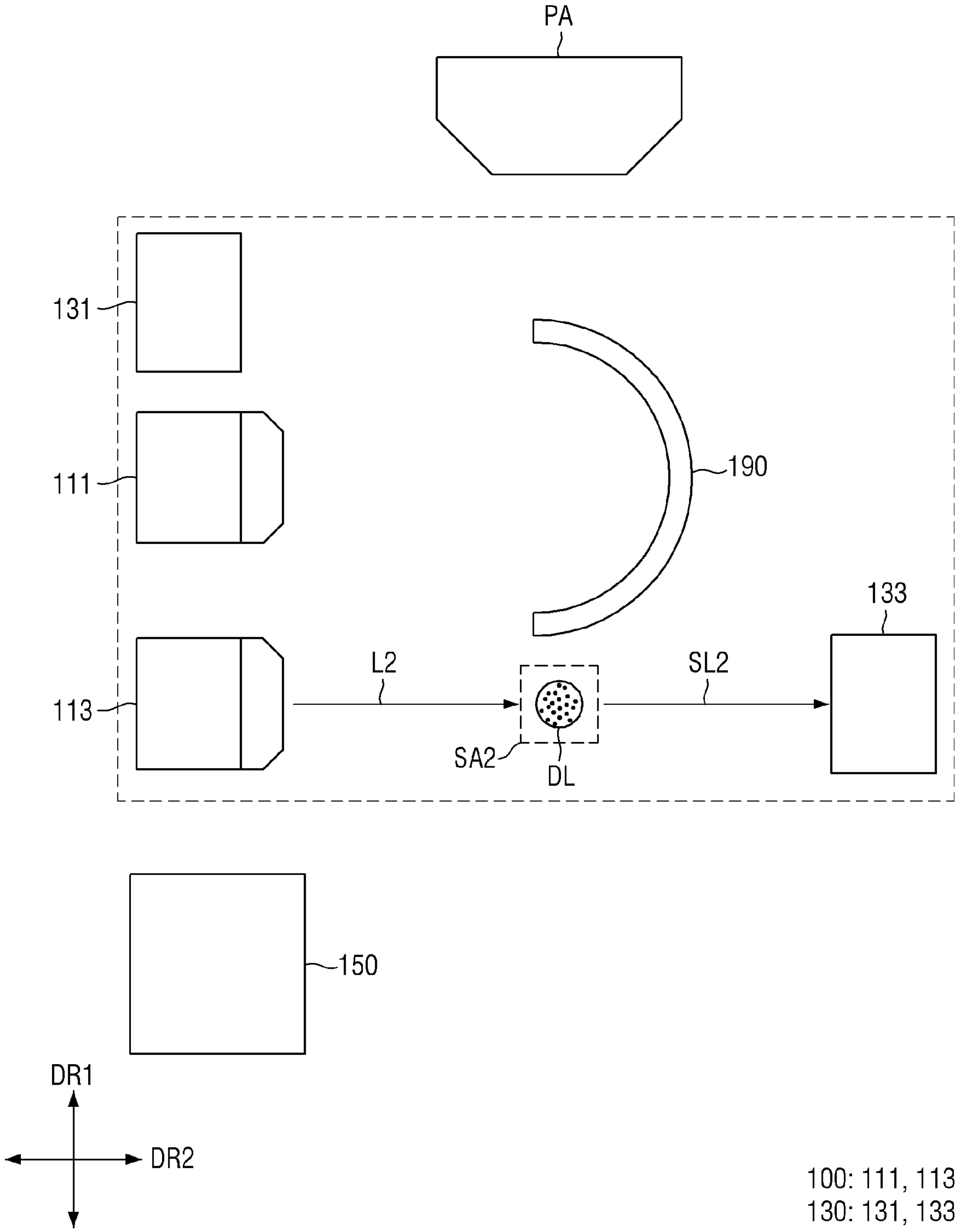

Next, referring to FIG. 15, when the ink DL ejected from the inkjet head PA passes through the second irradiation area SA2, the second light irradiation device 113 may irradiate the second irradiation area SA2 with the second light L2, and the second sensing device 133 may obtain data on the second exit light SL2 refracted from the ink DL (step S20). In the embodiment in which the ink concentration measuring device 100 of the inkjet printing apparatus 10 is disposed so that the second light irradiation device 113 and the second sensing device 133 face each other, the second light L2 irradiated to the second irradiation area SA2 may be refracted by the ink DL to be incident on the second sensing device 133 as the second exit light SL2. The second sensing device 133 may sense the second exit light SL2 to acquire data on the size, volume, and speed of the ink DL.

Figure 16:
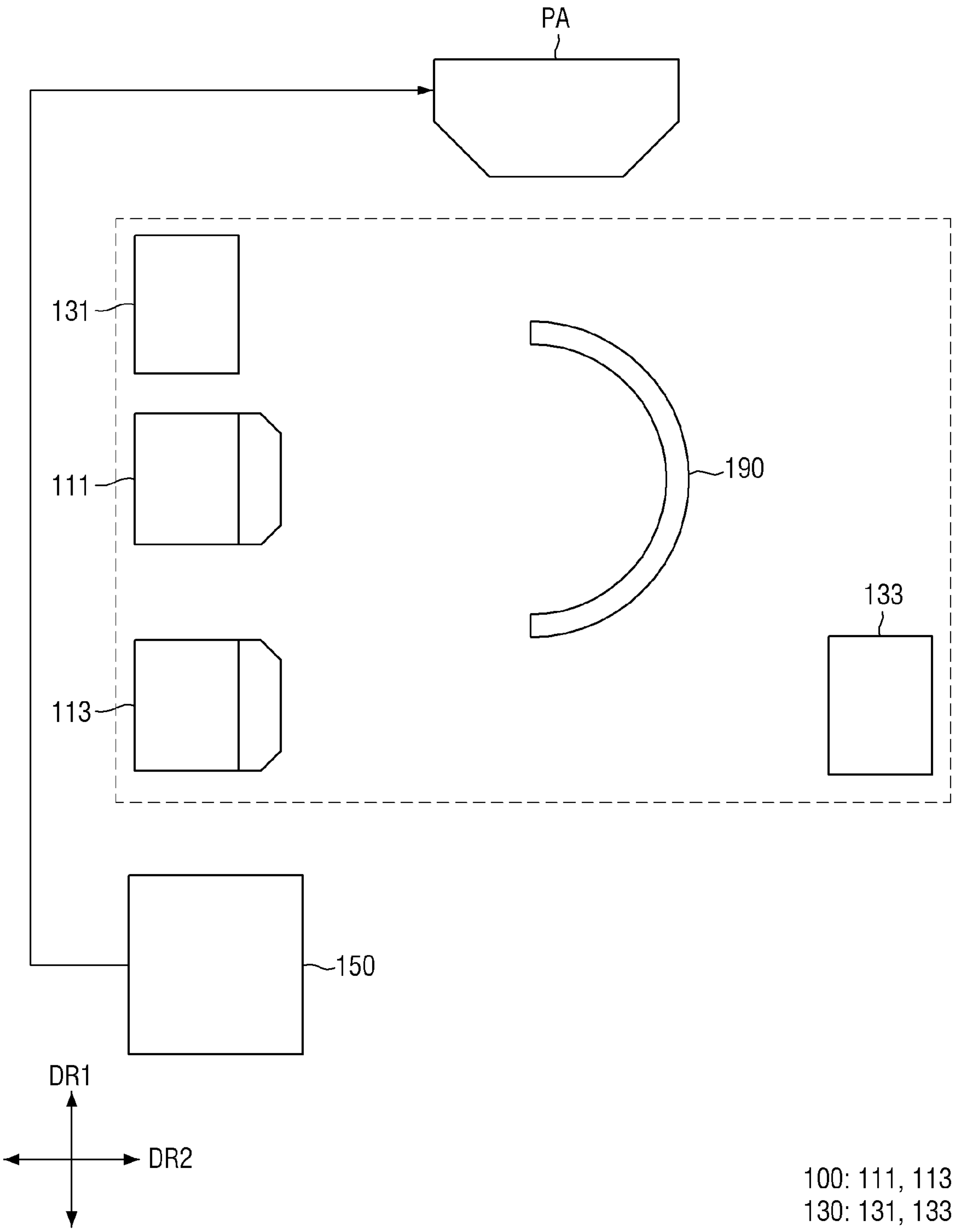

Next, referring to FIG. 16, the processor 150 of the ink concentration measuring device 100 may sense the concentration of the particles PT in the ink DL from data of the exit lights SL1 and SL2 acquired by the sensing device 130, and may determine whether the concentration of the particles PT in the ink DL deviates from the reference value (step S30). The processor 150 may calculate a change amount of the number of particles PT in the ink DL from the data of the first exit light SL1 acquired by the first sensing device 131, may calculate the size and volume of the ink DL ejected from the inkjet head PA from the data of the second exit light SL2 acquired by the second sensing device 133, and may calculate the concentration and a change amount in the concentration of the particles PT from the calculated values.

According to one embodiment, a change amount in the concentration of the particles PT calculated by the processor 150 may be calculated by comparing the data of the exit lights SL1 and SL2 acquired by the sensing device 130 with the data acquired in each printing process, and the concentration of the particles PT may be a value calculated through a comparison with the reference value stored in the processor 150 before the printing process. In the processor 150, when the concentration of the particles PT in the ink DL has a range necessary for the printing process, the data of the exit lights SL1 and SL2 appearing when the corresponding ink DL is irradiated with the lights L1 and L2 may be stored. As the printing process of the ink DL proceeds, the processor 150 may filter the data of the exit lights SL1 and SL2 acquired from the sensing device 130 in the same format as the previously stored reference value data, and may determine, through a method of mutual comparison, whether the concentration of the particles PT in the ink DL is out of an error range from the reference value (step S30).

Figure 17:
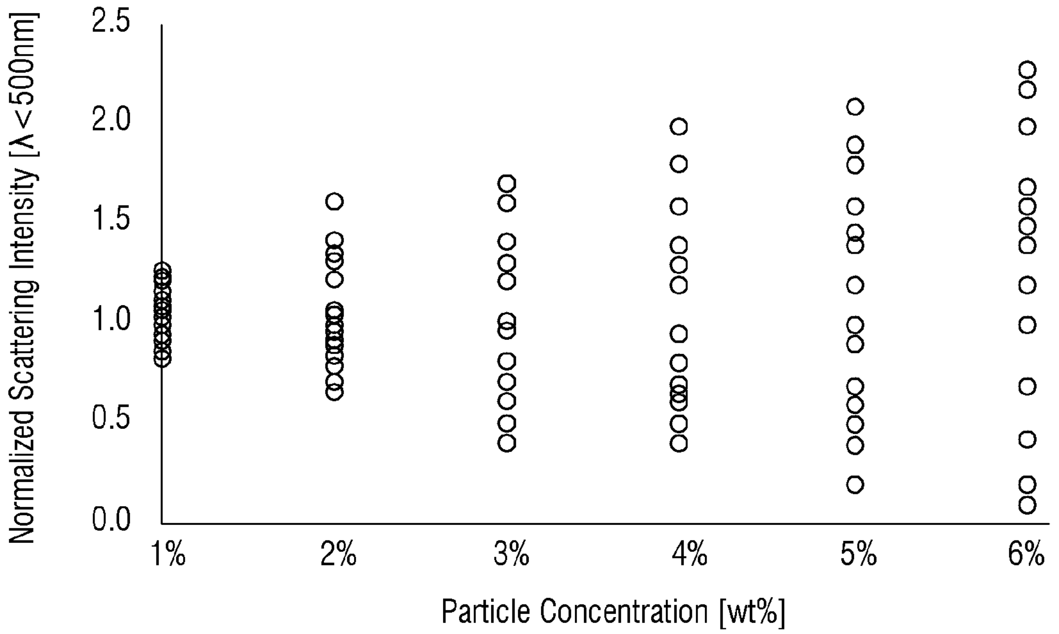
FIGS. 17 and 18 are graphs illustrating exit light data according to the concentration of particles in ink measured using an inkjet printing apparatus.
Figure 18:
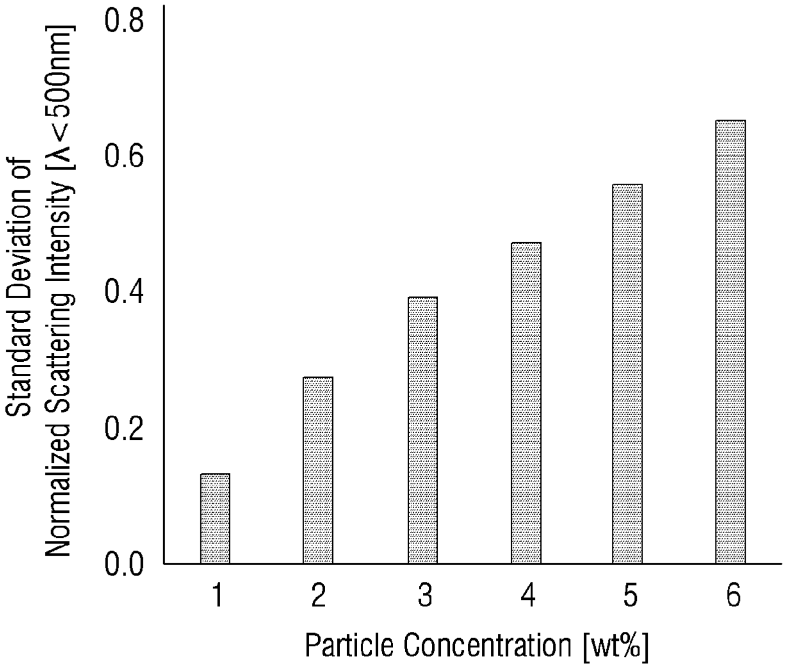

FIGS. 17 and 18 are graphs illustrating exit light data according to the concentration of particles in ink measured using an inkjet printing apparatus.

FIGS. 17 and 18 are graphs illustrating the normalized intensity of the exit lights SL1 and SL2 according to the concentration of the particles PT in the ink DL when the lights L1 and L2 irradiated from the light irradiation device 110 is scattered or refracted by the ink DL and is incident on the sensing device 130 as the exit lights SL1 and SL2. In the graph of FIG. 17, "Normalized Scattering Intensity," which is the Y-axis coordinate, is indicated by normalizing the scattering intensity of the first exit light SL1 when the first light L1, which is short wavelength light, is irradiated. It may be seen that when the normalized intensity of the first exit light SL1 has a value close to '1.0', the light is scattered by the ink DL to a small degree, and when the normalized intensity of the first exit light SL1 indicates a value far from '1.0', the light is scattered by the ink DL to a large degree.

FIG. 18 illustrates a calculation of a standard deviation value with respect to the normalized intensity of the first exit light SL1 of FIG. 17. In FIG. 18, a large standard deviation value may mean a large scattering intensity by the ink DL, and a small standard deviation value may mean a small scattering intensity by the ink DL.

Referring to FIGS. 17 and 18, it may be seen that as the concentration of the particles PT in the ink DL increases, more light exhibiting that the normalized intensity of the first exit light SL1 has a value farther from '1.0', is detected. Conversely, it may be seen that as the concentration of the particles PT in the ink DL decreases, more light exhibiting that the normalized intensity of the first exit light SL1 has a value close to '1.0', is detected. In addition, it may be seen that as the concentration of the particles PT in the ink DL decreases, the standard deviation value of the normalized intensity of the scattered light becomes small, and as the concentration of the particles PT in the ink DL increases, the standard deviation value of the normalized intensity of the scattered light becomes large.

In the processor 150 included in the ink concentration measuring device 100 of the inkjet printing apparatus 10, the exit light data according to the concentration of the particles PT in the ink DL may be stored. For example, when a case where the ink DL ejected from the inkjet head PA of the inkjet printing apparatus 10 has the particle PT concentration of 4 weight percentages (wt %) is set as the reference value, a data value in which the particle PT concentration of the ink DL is 4 wt % may be stored in the processor 150 as the data as illustrated in FIGS. 17 and 18.

The data of the exit lights SL1 and SL2 acquired from the first sensing device 131 and the second sensing device 133 while performing the printing process of the ink may be included in the processor 150 as the normalized intensity of the scattered light and the standard deviation value of the normalized intensity as illustrated in FIGS. 17 and 18. In the first sensing device 131, data on the number of particles PT are acquired as the data of the first exit light SL1 by the short wavelength light, which may be compensated by the data on the volume of the ink DL that is the data of the second exit light SL2 by the long wavelength light at the second sensing device 133. When the volume and size of the ink DL are simply ignored and the reference value data is compared only with the data of the first exit light SL1, the change amount according to the volume change per unit droplet of the ink DL is not taken into account, and thus there may be errors in terms of the error range determination. Accordingly, the processor 150 may comprehensively filter the data acquired from each of the first sensing device 131 and the second sensing device 133 to calculate the intensity of the exit lights SL1 and SL2 and a standard deviation value of the intensity.

Next, the processor 150 compares the values calculated from the exit light data with the stored reference value to determine whether the values are out of the error range. Here, the reference value stored in the processor 150 may be a value set by a user using the inkjet printing apparatus 10. However, the disclosure is not limited thereto, and the reference value may be a setting value that the inkjet printing apparatus 10 learns while repeating the printing process.

According to one embodiment, the processor 150 may further store a data value for the error range in addition to the reference value data for the concentration of the particles PT in the ink DL. The reference value data that may be stored in the processor 150 may be data about the normalized intensity of scattered light (FIG. 17) as the exit light data by the ink DL and a standard deviation value of the normalized intensity (FIG. 18), and the processor 150 may store the error range based on each data. The processor 150 may store the normalized intensity and standard deviation value of the exit light according to the concentration of the particles PT in the ink DL as one or more data. For example, in addition to the data for the ink DL of the 4 wt % concentration that serves as the reference value, the processor 150 may further store data for 1 wt %, 2 wt %, 3 wt %, 5 wt %, 6 wt %, and the like as data within the error range from the reference value, and data outside the error range.

In addition to the cases illustrated with reference to the drawings, a large number of data values may be stored in the processor 150. Accordingly, the processor 150 may more accurately calculate the concentration of the particles PT in the ink DL ejected in the process by making a comparison with the data values of different concentration ranges than a case where the value calculated during the printing process is compared with only the reference value in the error range.

When the processor 150 determines that the calculated value is out of the error range compared to the reference value when comparing the values calculated from the exit light data with the stored reference value and additional data, the processor 150 may control the concentration of the particles PT in the ink DL by feeding back the corresponding result to the inkjet head PA (step S40). For example, when the value calculated from the exit light data by the processor 150 indicates the concentration of the particles PT that is lower than the reference value, the processor 150 may provide feedback to the inkjet head PA to increase the concentration of the particles PT in the ink DL. Conversely, when the value calculated from the exit light data by the processor 150 indicates the concentration of the particles PT that is higher than the reference value, the processor 150 may provide feedback to the inkjet head PA to decrease the concentration of the particles PT in the ink DL. Alternatively, when it is determined that the value calculated from the exit light data by the processor 150 is within the error range compared to the reference value, the printing process may be repeated without adjusting the concentration of the particles PT in the ink DL.

Through the above process, a method of printing the ink utilizing the inkjet printing apparatus 10 may be performed. The inkjet printing apparatus 10 according to one embodiment may include the ink concentration measuring device 100 to calculate and sense in real time a change amount in the concentration of the particles PT in the ink DL while the printing process is performed. The inkjet printing apparatus 10 has an advantage in that the quality of the product formed by the printing process may be uniformly maintained by feeding back the change amount sensed in real time to the inkjet head PA.

In the above-described embodiment, the ink concentration measuring device 100 of the inkjet printing apparatus 10 may go through a process of storing the reference value data set by the user in the processor 150. However, the disclosure is not limited thereto, and a method of printing the ink using the inkjet printing apparatus 10 may further include storing an initial value related to the concentration of the particles PT in the ink DL in the processor 150 before printing the ink DL on the target product.

Figure 19:
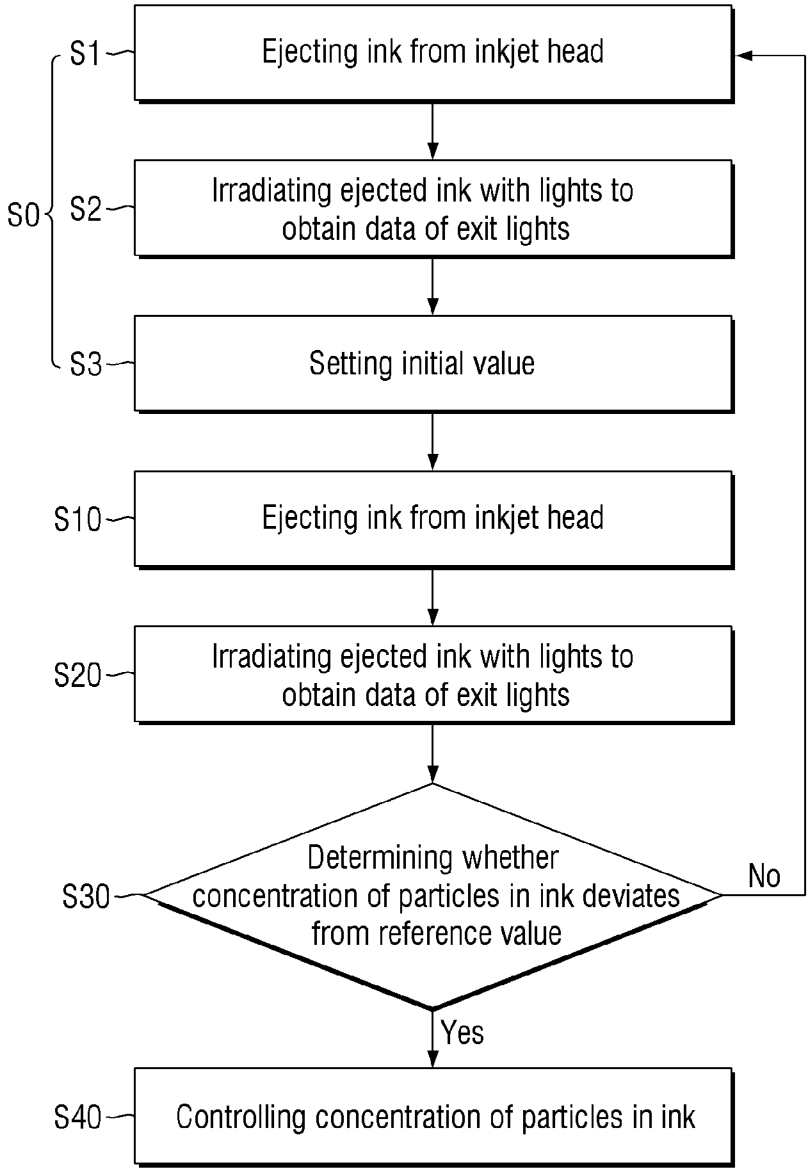
FIG. 19 is a flowchart illustrating a method of printing the ink using an inkjet printing apparatus according to another embodiment.

FIG. 19 is a flowchart illustrating a method of printing the ink using an inkjet printing apparatus according to another embodiment.

Referring to FIG. 19, a method of printing the ink according to one embodiment may further include storing initial value data in the processor 150 (step S0) as a step performed before the steps S10 to S40 of printing the ink DL on the target product in the embodiment of FIG. 12. The step S0 of storing initial value data may include ejecting the ink DL in which the particles PT are dispersed from the inkjet head PA (step S1), irradiating the ejected ink DL with the lights L1 and L2 to obtain data of the exit lights SL1 and SL2 (step S2), and setting an initial value of the concentration of the particles PT in the ink DL (step S3). Although the drawing illustrates that the step S0 of storing initial value data is performed once, the disclosure is not limited thereto. The step S0 of storing initial value data may be performed at least once, and this step may be repeatedly performed several times according to the product specification of the inkjet printing apparatus 10. The embodiment may include the storing an initial value through a trial run of the inkjet printing apparatus 10 without storing a separate reference value in the processor 150. The step S1 of ejecting the ink DL in which the particles PT are dispersed and the step S2 of irradiating the ejected ink DL with the lights L1 and L2 to obtain data of the exit lights SL1 and SL2 are substantially the same as described above with reference to FIGS. 12 to 18. A detailed description thereof will be omitted.

When the ink DL in which the particles PT are dispersed is fabricated, an initial value to be stored in the processor 150 by utilizing the inkjet printing apparatus 10 may be set without undergoing an experiment for generating exit light data from the ink DL produced as a separate sample. Accordingly, there are advantages in that an initial value that meets the specifications of the corresponding inkjet printing apparatus 10 may be set and the concentration of the particles PT may be sensed more accurately than storing separate reference value data as in the embodiment of FIG. 12.

When it is determined that the step S0 of storing initial value data is completed, the processor 150 ejects the ink DL on the target product as in the embodiment of FIG. 12 and determines for each printing process whether the concentration of the particles PT in the ink DL is out of the error range from the stored initial value. According to the result determined by the processor 150, the inkjet head PA may repeat the ejection of the ink DL, or may perform the step S40 of controlling the concentration of the particles PT in the ink DL injected into the inkjet head PA.

In the above embodiments, the inkjet head PA is exemplified that the ink DL is ejected from one nozzle, but the disclosure is not limited thereto. The inkjet head PA may simultaneously eject a plurality of inks DL including a plurality of nozzles ('NZ' in FIG. 20) in another embodiment. Some of the inks DL ejected from the plurality of nozzles NZ of the inkjet head PA may be seated in the same area, and the inks DL ejected from the plurality of different nozzles NZ may form one layer or pattern within a predetermined area. The inkjet printing apparatus 10 according to one embodiment not only may sense the number or concentration of the particles PT per unit droplet of the ink DL ejected for each nozzle NZ, but also may sense a change in the total number of particles PT included the plurality of inks DL ejected in the plurality of the nozzles NZ or the differences between the numbers of the particles PT included in the ink DL ejected from nozzles NZ.

Figure 20:
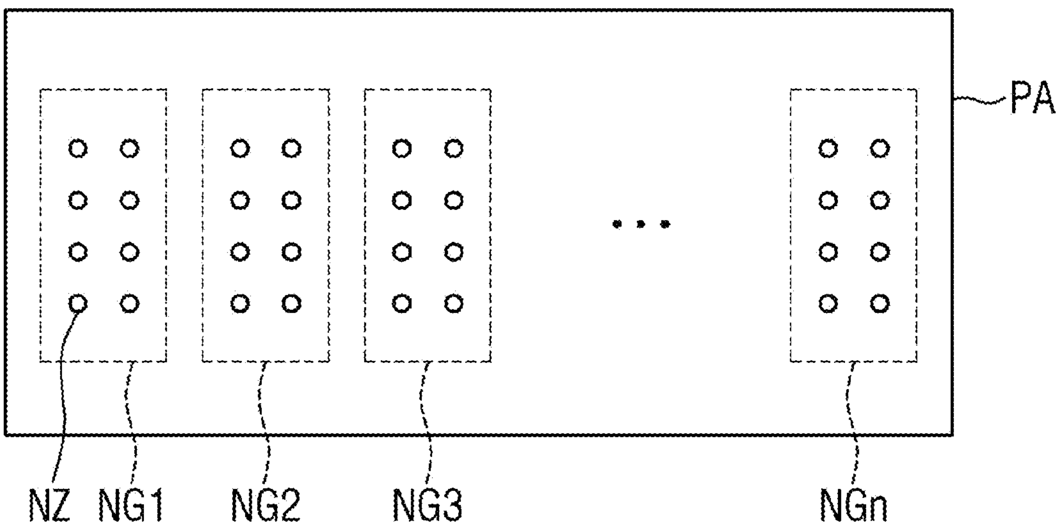
FIG. 20 is a diagram illustrating the disposition of a plurality of nozzles included in an inkjet head of an inkjet printing apparatus according to one embodiment.
Figure 21:
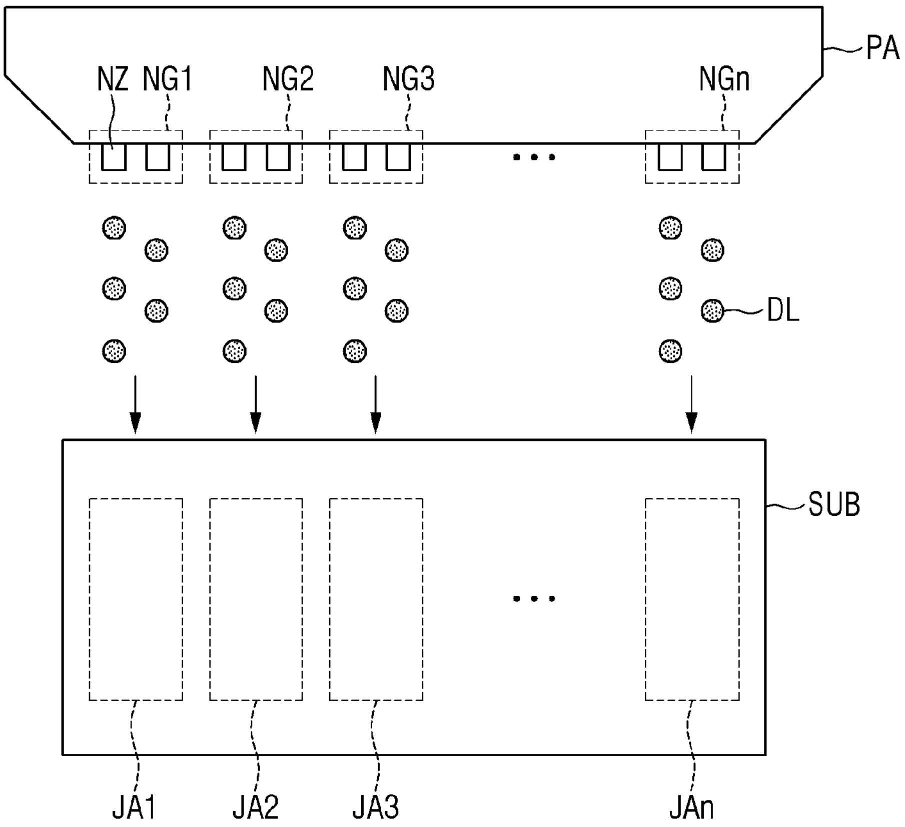
FIG. 21 is a diagram illustrating ink ejection from a plurality of nozzles included in the inkjet head of FIG. 20.

FIG. 20 is a diagram illustrating the disposition of a plurality of nozzles included in an inkjet head of an inkjet printing apparatus according to one embodiment. FIG. 21 is a diagram illustrating ink ejection from a plurality of nozzles included in the inkjet head of FIG. 20. FIG. 20 is a plan view of the inkjet head PA as viewed from one surface on which the plurality of nozzles NZ are provided.

Referring to FIGS. 20 and 21, the inkjet head PA of the inkjet printing apparatus 10 may have a shape extending in one direction and include the plurality of nozzles NZ arranged in the one direction and the other direction. The plurality of nozzles NZ may be disposed on one surface of the base portion of the inkjet head PA, for example, on a bottom surface of the base portion. The plurality of nozzles NZ may have a shape partially protruding from the bottom surface of the inkjet head PA, but is not limited thereto. For example, the plurality of nozzles NZ may penetrate the bottom surface of the base portion of the inkjet head PA and be connected to a pipe (not illustrated) disposed inside the inkjet head PA.

The plurality of nozzles NZ may be arranged in one direction in which the inkjet head PA extends and the other direction perpendicular to the one direction. The plurality of nozzles NZ may be arranged in one row or two or more rows arranged in the one direction. In one inkjet head PA, the plurality of inks DL may be simultaneously ejected from the plurality of nozzles NZ, and the inks DL ejected from the different nozzles NZ may be seated in different areas JA1, JA2, JA3, . . . JAn formed on the target substrate SUB, respectively, serving as a printing target.

For example, the plurality of nozzles NZ disposed in the inkjet head PA may be divided into the plurality of the nozzle groups NG1, NG2, NG3, . . . NGn that eject the inks DL to the plurality of areas JA1, JA2, JA3, . . . JAn formed on the target substrate SUB, respectively. Each of the nozzle groups NG1, NG2, NG3, . . . NGn may be constituted with one or more nozzles NZ, and the inks DL simultaneously ejected from the one or more nozzles NZ may be seated together in the predetermined areas JA1, JA2, JA3, . . . JAn of the target substrate SUB, respectively.

The plurality of nozzles NZ belonging to the first nozzle group NG1 of the inkjet head PA may eject the inks DL to the first area JA1 of the target substrate SUB. The plurality of nozzles NZ belonging to the second nozzle group NG2 may eject the ink DL to the second area JA2 of the target substrate SUB, and the plurality of nozzles NZ belonging to the third nozzle group NG3 and the n-th nozzle group NGn may eject the inks DL to the third area JA3 and the n-th area JAn of the target substrate SUB, respectively. The plurality of nozzles NZ may be divided into the different nozzle groups NG1, NG2, NG3, . . . NGn according to a position in which each of the nozzles NZ is disposed and the areas JA1, JA2, JA3, . . . JAn in which the ejected ink DL is seated on the target substrate SUB. However, the disclosure is not limited thereto, and each nozzle NZ may be divided into the different nozzle groups NG1, NG2, NG3, . . . NGn according to a preset condition in the inkjet head PA of the inkjet printing apparatus 10.

When the plurality of nozzles NZ simultaneously eject the inks DL to any one area JA1, JA2, JA3, . . . JAn, the quality of a layer or pattern formed by seating the ink DL on the target substrate SUB may be achieved by uniformly maintaining the concentration of the particles PT in the ejected ink DL for each nozzle NZ, but may also be achieved by uniformly maintaining the total number of particles PT included in the plurality of inks DL simultaneously ejected from the plurality of nozzles NZ belonging to each nozzle group NG1, NG2, NG3, . . . NGn. For example, the quality of a layer or pattern formed by the inks DL seated in the first area JA1 of the target substrate SUB may be achieved by uniformly maintaining the total number of particles PT included in the inks DL ejected from the nozzles NZ belonging to the first nozzle group NG1. Although not illustrated in the drawings, the plurality of inks DL ejected from the inkjet head PA similarly to the above-described embodiment may be maintained to have the constant number or concentration of the particles PT in the ink DL by the ink concentration measuring device 100 and the operation thereof. According to one embodiment, in the inkjet printing apparatus 10, the ink concentration measuring device 100 may sense a change in the concentration of the particles PT in the entire ink DL ejected from each nozzle group NG1, NG2, NG3, . . . NGn or a change in the concentration of the particles PT in the ink DL ejected from the other nozzle groups NG1, NG2, NG3, . . . NGn and may feed the change back to the inkjet printing apparatus 10.

Figure 22:
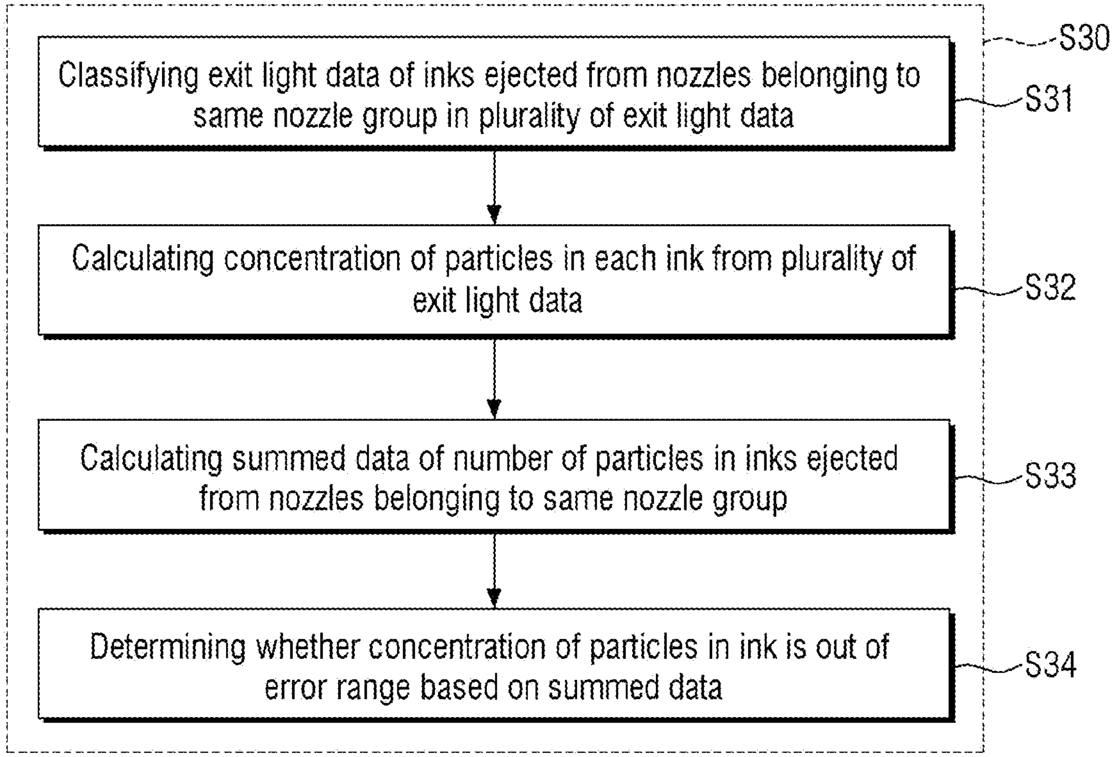
FIG. 22 is a flowchart illustrating a sequence of some steps of a method of printing the ink according to one embodiment.

FIG. 22 is a flowchart illustrating a sequence of some steps of a method of printing the ink according to one embodiment. FIG. 22 illustrates in more detail the steps performed in the step S30 of determining whether the concentration of the particles PT in the ink DL deviates from the reference value in the method of printing the ink of FIGS. 12 and 19.

Referring to FIG. 22, in a method of printing the ink according to one embodiment, the step S30 of determining whether the concentration of the particles PT in the ink DL deviates from the reference value may include classifying the exit light data of the inks DL ejected from the nozzles NZ belonging to the same nozzle group NG1, NG2, NG3, . . . NGn in a plurality of exit light data (step S31), calculating the concentration of the particles PT in each ink DL from the plurality of exit light data (step S32), calculating the summed data of the number of particles PT in the inks DL ejected from the nozzles NZ belonging to the same nozzle group NG1, NG2, NG3, . . . NGn (step S33), and determining whether the concentration of the particles PT in the ink DL is out of the error range based on the summed data (step S34). The embodiment differs from the above-described embodiments, in which the concentration of the particles PT of each ink DL is sensed, in that a change in the number of particles PT in the entire ink DL ejected from the nozzle groups NG1, NG2, NG3, . . . NGn including the plurality of nozzles NZ is sensed.

When the ink DL is ejected from the plurality of nozzles NZ, in the ink concentration measuring device 100 of the inkjet printing apparatus 10, the light irradiation device 110 and the sensing device 130 may allow the exit light data from each ink DL to be obtained. This is the same as described with reference to the above-described embodiments. When the light irradiation device 110 irradiates each ink DL with light, the sensing device 130 may obtain data on the scattered or refracted light from the ink DL.

Then, the processor 150 of the ink concentration measuring device 100 classifies the plurality of exit light data for each ink DL obtained by the sensing device 130 into the exit light data of the ink DL ejected from the nozzles NZ belonging to the same nozzle group NG1, NG2, NG3, . . . NGn (step S31). For example, data on the ink DL ejected from the nozzles NZ belonging to the first nozzle group NG1 may be classified as the exit light data of the first nozzle group NG1, and data on the ink DL ejected from the nozzles NZ belonging to the second nozzle group NG2 may be classified as the exit light data of the second nozzle group NG2. Data on the inks DL ejected from the nozzles NZ belonging to the different nozzle groups NG1, NG2, NG3, . . . NGn may also be classified as the exit light data of the different nozzle groups NG1, NG2, NG3, . . . NGn, respectively. The exit light data classified into the same nozzle group, together with the data on the ink DL ejected from the other nozzles NZ, may be considered as the data on the entire ink DL ejected from the nozzles NZ belonging to the corresponding nozzle group NG1, NG2, NG3, . . . NGn.

Next, the concentration of the particles PT in the ink DL is calculated from each of the plurality of exit light data (step S32), and the summed data of the number of particles PT in the ink DL ejected from the nozzles NZ belonging to the same nozzle group NG1, NG2, NG3, . . . NGn is calculated from the exit light data belonging to the same group (step S33). In this step, the data on the particle concentration for the entire ink DL ejected from the nozzles NZ of the same nozzle group NG1, NG2, NG3, . . . NGn is calculated, not the particle concentration for each of the inks DL ejected from each nozzle NZ. For example, in addition to the particle PT concentration of the ink DL ejected from the plurality of nozzles NZ belonging to the first nozzle group NG1, the concentration or number of particles PT in all of the inks DL simultaneously ejected from the first nozzle group NG1 may be calculated by adding the concentration of the particles PT of each ink DL. The first summed data may be calculated from the inks DL ejected from the first nozzle group NG1, and the second summed data may be calculated from the inks DL ejected from the second nozzle group NG2. For each of the other nozzle groups NG1, NG2, NG3, . . . NGn, similarly, the n-th summed data may be calculated from all of the inks DL ejected at the same time. The n-th summed data may be reference data of the concentration of the particles PT in the ink DL.

As described above, finally since the inks DL ejected from the nozzles NZ belonging to the same nozzle group NG1, NG2, NG3, . . . NGn form a layer or pattern including the particles PT on the target substrate SUB, the quality of the layer or pattern may vary depending on the concentration of the particles PT in the entire ink DL ejected from the nozzles NZ belonging to any one of the nozzle groups NG1, NG2, NG3, . . . NGn rather than the concentration of the particles PT in one ink DL. Although there is a change in the concentration of the particles PT in the ink DL ejected for each nozzle NZ, when there is no change in the concentration or number of particles PT in the entire ink DL ejected from the nozzles NZ belonging to the same nozzle group NG1, NG2, NG3, . . . NGn, a layer or pattern formed by the inks DL ejected from the nozzles NZ of the corresponding nozzle group NG1, NG2, NG3, . . . NGn may maintain uniform quality.

According to one embodiment, the ink printing apparatus may determine whether the concentration of the particles PT in the ink DL is out of the error range based on the summed data of the exit light data on the inks DL ejected from the nozzles NZ of the same nozzle group NG1, NG2, NG3, . . . NGn (step S34). Although there is a change in the number or concentration of the particles PT in the ink DL ejected from each nozzle NZ, there may be no change in the concentration of the inks DL ejected from the same nozzle group NG1, NG2, NG3, . . . NGn due to a change in the number or concentration of the particles PT generated from other nozzles NZ belonging to the same nozzle group NG1, NG2, NG3, . . . NGn. In this case, the ink DL ejected in the corresponding printing process has the particles PT ejected within a range of the reference value, and thus the same process may be repeated without controlling the number of particles PT in the ink DL.

Conversely, although a change in the number or concentration of the particles PT generated in each ink DL falls within a range of the reference value, when a change in the number or concentration of the particles PT in all of the inks DL ejected from the same nozzle group NG1, NG2, NG3, . . . NGn deviates from the reference value, the concentration of the particles PT in the ink DL may be controlled in the next process. According to one embodiment, in the ink concentration measuring device 100 of the inkjet printing apparatus 10, the processor 150 may further store the reference value for the number or concentration of the particles PT in the entire ink DL ejected from the same nozzle group NG1, NG2, NG3, . . . NGn in addition to the reference value for the number or concentration of the particles PT per unit droplet of each ink DL. In the printing process, in addition to a change in the concentration of the particles PT for each of the ejected inks DL, the processor 150 may calculate a change in the concentration of the particles PT for the entire ink DL ejected from the same nozzle group NG1, NG2, NG3, . . . NGn. Accordingly, in the inkjet printing apparatus 10 according to one embodiment, when the ink DL is ejected for each of the areas JA1, JA2, JA3, . . . JAn in the target substrate SUB on which the printing process is performed, the quality of the layer or pattern formed in each of the areas JA1, JA2, JA3, . . . JAn may be uniformly maintained by simultaneously ejecting the inks DL from the plurality of nozzles NZ.

On the other hand, the target substrate SUB including the plurality of areas JA1, JA2, JA3, . . . JAn may have a layer or pattern formed in each of the areas JA1, JA2, JA3, . . . JAn having the same number of particles PT by one ink printing process, but the disclosure is not limited thereto. In another embodiment, for example, when the inks DL ejected from the first nozzle group NG1 and the second nozzle group NG2 form a layer or pattern in the first area JA1 and the second area JA2 of the target substrate SUB, the layer formed in the first area JA1 and the layer formed in the second area JA2 may include substantially the same number of particles PT or may not. This may vary depending on a design condition of a layer or pattern formed on the target substrate SUB. When the same layer or pattern should be formed regardless of the position of each of the areas JA1, JA2, JA3, . . . JAn in one printing process, the number or concentration of the particles PT in the inks DL ejected from the different nozzle groups NG1, NG2, NG3, . . . NGn should be maintained to be uniform with each other. Conversely, when different layers or patterns should be formed according to the position of each of the areas JA1, JA2, JA3, . . . JAn in one printing process, the number or concentration of the particles PT in the inks DL ejected from the different nozzle groups NG1, NG2, NG3, . . . NGn should be individually maintained to be uniform.

In a method of printing the ink according to one embodiment, the method of the determining whether the concentration of the particles PT in the ink DL is out of the error range (step S34) may be different according to a design value of a layer or pattern formed on the target substrate SUB on which the ink printing process is performed.

Figure 23:
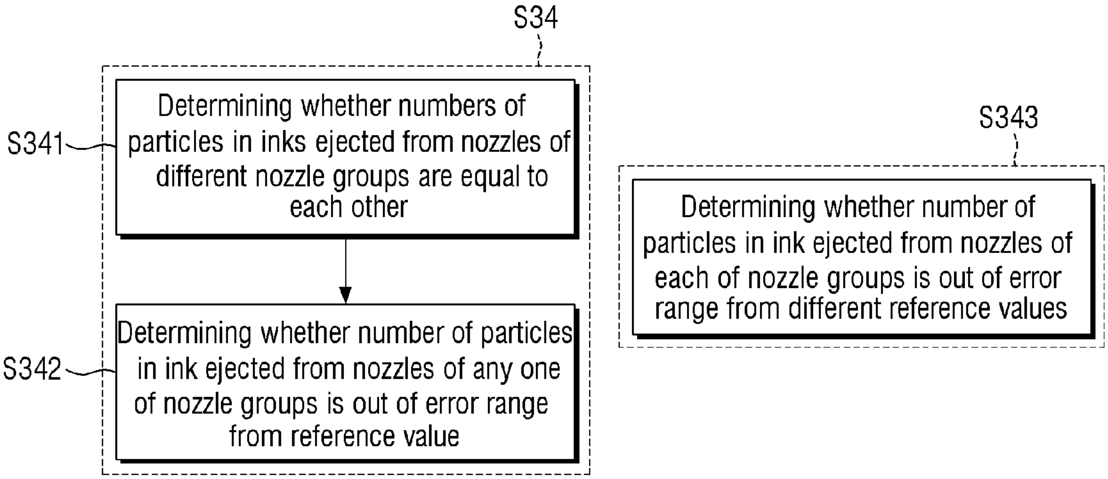
FIG. 23 is a flowchart illustrating a sequence of one step of FIG. 22.

FIG. 23 is a flowchart illustrating a sequence of one step of FIG. 22. FIG. 23 illustrates in more detail the step S34 of determining whether the concentration of the particles PT in the ink DL is out of the error range based on the summed data of FIG. 22.

Referring to FIG. 23 in conjunction with FIG. 22, in the embodiment in which the same layer or pattern regardless of the position of each of the areas JA1, JA2, JA3, . . . JAn is formed in one printing process on the target substrate SUB on which the ink printing process is performed, the step S34 of determining whether the concentration of the particles PT in the ink DL is out of the error range may include determining whether the numbers of particles PT in the inks DL ejected from the nozzles NZ of the different nozzle groups NG1, NG2, NG3, . . . NGn are equal to each other (step S341), and determining whether the number of particles PT in the ink DL ejected from the nozzles NZ of any one of the nozzle groups NG1, NG2, NG3, . . . NGn is out of the error range from the reference value (step S342).

Before determining whether the ink DL ejected from each of the plurality of nozzle groups NG1, NG2, NG3, . . . NGn is out of the error range from the reference value, it is possible to determine whether the ink DL ejected from which nozzle group NG1, NG2, NG3, . . . NGn has a different data value by comparing the data on the inks DL ejected from the different nozzle groups NG1, NG2, NG3, . . . NGn with each other. Since the same layer or pattern should be formed regardless of the position of each of the areas JA1, JA2, JA3, . . . JAn in one printing process, the number or concentration of the particles PT in the ink DL is desirable to be the same although the inks DL are ejected from the different nozzle groups NG1, NG2, NG3, . . . NGn.

For example, the first summed data, the second summed data, and the third summed data for the inks DL ejected from the first nozzle group NG1, the second nozzle group NG2, and the third nozzle group NG3 are compared with each other, so that the nozzle groups NG1, NG2, NG3, . . . NGn having different summed data among the summed data may be selected. When the first nozzle group NG1 has a data value different from that of the second nozzle group NG2 and the third nozzle group NG3, in a subsequent step, it is determined whether the number of particles PT in the ink DL ejected from the nozzles NZ of the first nozzle group NG1 is out of the error range from the reference value (step S342). When the first summed data of the inks DL ejected from the first nozzle group NG1 is out of the error range from the reference value, the concentration or number of particles PT in the ink DL ejected from the nozzles of the first nozzle group NG1 is controlled (step S40). On the other hand, when the first summed data of the ink DL ejected from the first nozzle group NG1 is not out of the error range from the reference value, the concentration or number of particles PT in the ink DL ejected from the nozzles of the nozzle groups NG1, NG2, NG3, . . . NGn, which include the second nozzle group NG2 and the third nozzle group NG3, having a summed data value different from that of the first nozzle group NG1 is controlled (step S40).

Although the summed data for the inks DL ejected from the first nozzle group NG1, the second nozzle group NG2, and the third nozzle group NG3 are compared with each other and they are substantially equal to each other or have the data values within the error range, in a subsequent step, it is determined whether the number of particles PT in the ink DL ejected from the nozzles NZ of any one of the nozzle groups NG1, NG2, NG3, . . . NGn is out of the error range from the reference value (step S342). When the data of the ejected ink DL of the first nozzle group NG1 is not out of the error range from the reference value, the printing process is repeated without controlling the number of particles PT in the ink DL, and when the data is out of the error range from the reference value, the number of particles PT in the ink DL in all of the plurality of nozzle groups NG1, NG2, NG3, . . . NGn may be controlled (step S40), and the printing process may be performed. In this case, in the ink concentration measuring device 100 of the inkjet printing apparatus 10, the processor 150 may store the reference values for the plurality of nozzle groups NG1, NG2, NG3, . . . NGn as the same value. Since the different nozzle groups NG1, NG2, NG3, . . . NGn should eject the same number of particles PT, the reference value stored in the processor 150 may be equally applied, independent of the nozzle groups NG1, NG2, NG3, . . . NGn.

On the other hand, in the embodiment in which different layers or patterns according to the position of the areas JA1, JA2, JA3, . . . JAn are formed in one printing process on the target substrate SUB on which the ink printing process is performed, the step S34 of determining whether the concentration of the particles PT in the ink DL is out of the error range may include determining whether the number of particles PT in the ink DL ejected from the nozzles NZ of each of the nozzle groups NG1, NG2, NG3, . . . NGn is out of the error range from the different reference values (step S343).

Since different layers or patterns should be formed according to the position of the areas JA1, JA2, JA3, . . . JAn in one printing process, when the inks DL are ejected from the different nozzle groups NG1, NG2, NG3, . . . NGn, the number or concentration of particles PT in each ink DL is desirable to be controlled according to a different preset reference value.

Figure 24:
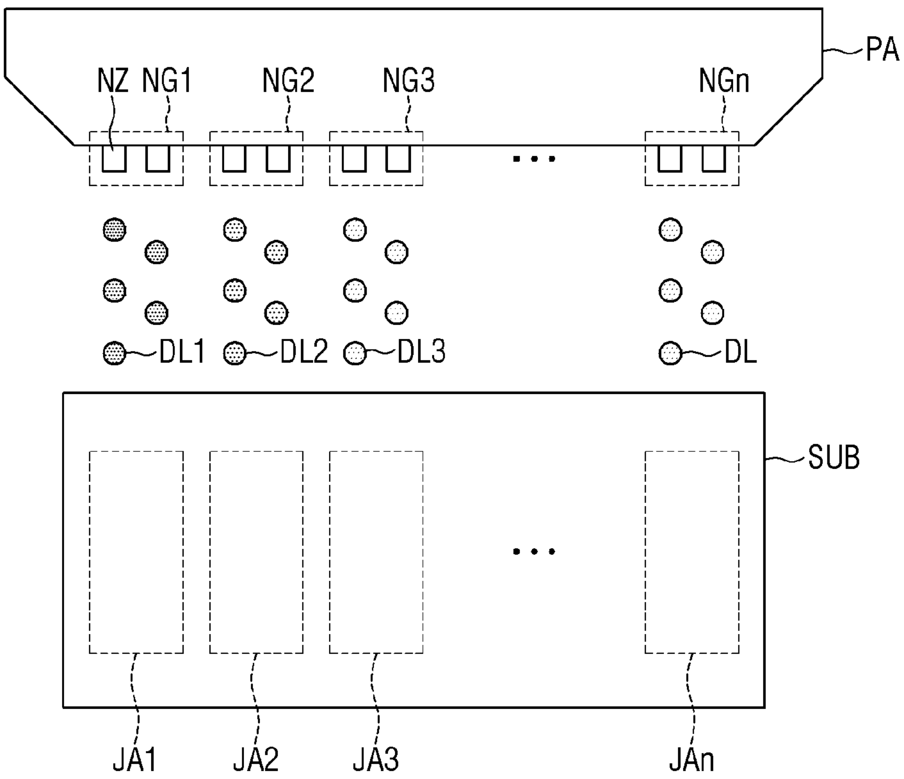
FIG. 24 is a diagram illustrating one step of FIG. 23.

FIG. 24 is a diagram illustrating one step of FIG. 23.

Referring to FIG. 24 in conjunction with FIGS. 22 and 23, the inks DL (DL1, DL2, and DL3) respectively ejected to the different areas JA1, JA2, JA3, . . . JAn of the target substrate SUB may have the different numbers of particles PT. For example, in the first area JA1, the nozzles NZ of the first nozzle group NG1 may eject the first ink DL1, and in the second area JA2, the nozzles NZ of the second nozzle group NG2 may eject the second ink DL2. As described above, in the third area JA3 and the n-th area JAn, the nozzles NZ of the third nozzle group NG3 and the n-th nozzle group NGn may eject the third ink DL3 or other ink DL, respectively. Each of the first ink DL1, the second ink DL2, and the third ink DL3 may be set to include the different number or concentration of particles PT per unit droplet. In addition, the number or concentration of the particles PT may be different in all of the inks DL ejected from the different nozzle groups NG1, NG2, NG3, . . . NGn.

When the summed data for the ink DL ejected from the first nozzle group NG1, the second nozzle group NG2, and the third nozzle group NG3 is calculated, each of the summed data is compared with different reference values to determine whether the summed data is out of the error range (step S343). For the first ink DL1 ejected from the first nozzle group NG1, it is determined whether the summed data is out of the error range based on the first reference value, and for the second ink DL2 ejected from the second nozzle group NG2, it is determined whether the summed data is out of the error range based on the second reference value. Even in the case of the other nozzle groups NG1, NG2, NG3, . . . NGn, it is determined whether each is out of an error range based on different reference values. As a result of comparison with the reference value based on the data of each of the nozzle groups NG1, NG2, NG3, . . . NGn, when the ink DL of some nozzle groups NG1, NG2, NG3, . . . NGn is out of the error range, the number of particles PT in the ink DL ejected from the corresponding nozzle groups NG1, NG2, NG3, . . . NGn may be controlled (step S40).

In this case, in the ink concentration measuring device 100 of the inkjet printing apparatus 10, the processor 150 may store the reference values different from each other, or the reference values in which at least some are different from each other for the plurality of nozzle groups NG1, NG2, NG3, . . . NGn. When a layer or pattern including a different number of particles PT is formed in each of the plurality of areas JA1, JA2, JA3, . . . JAn of the target substrate SUB, the number of reference values stored in the processor 150 may be the same as the number of different areas JA1, JA2, JA3, . . . JAn of the target substrate SUB. On the other hand, when a layer or pattern including the same number of particles PT is formed in some of the plurality of areas JA1, JA2, JA3, . . . JAn of the target substrate SUB, the number of reference values stored in the processor 150 may be different from the number of different areas JA1, JA2, JA3, . . . JAn of the target substrate SUB.

In the inkjet printing apparatus 10 according to one embodiment, the inkjet head PA includes the plurality of nozzles NZ, which may be classified into the plurality of nozzle groups NG1, NG2, NG3, . . . NGn. Accordingly, the ink concentration measuring device 100 may sense the number or a change in the concentration of the particles PT in the ink DL in units of the plurality of nozzle groups NG1, NG2, NG3, . . . NGn.

The inkjet printing apparatus 10 according to one embodiment may be utilized to fabricate a display device ('1000' in FIG. 29) including a different layer or pattern for each of the areas JA1, JA2, JA3, . . . JAn. The display device 1000 may include the plurality of areas JA1, JA2, JA3, . . . JAn, and different layers or patterns may be formed in each of the areas JA1, JA2, JA3, . . . JAn, or in some of the plurality of areas JA1, JA2, JA3, . . . JAn, the same layer or pattern may be formed, and in at least some of the plurality of areas JA1, JA2, JA3, . . . JAn, different layers or patterns may be formed. Hereinafter, a method of fabricating the display device 1000 utilizing the inkjet printing apparatus 10 will be described with reference to other drawings.

Figure 25:
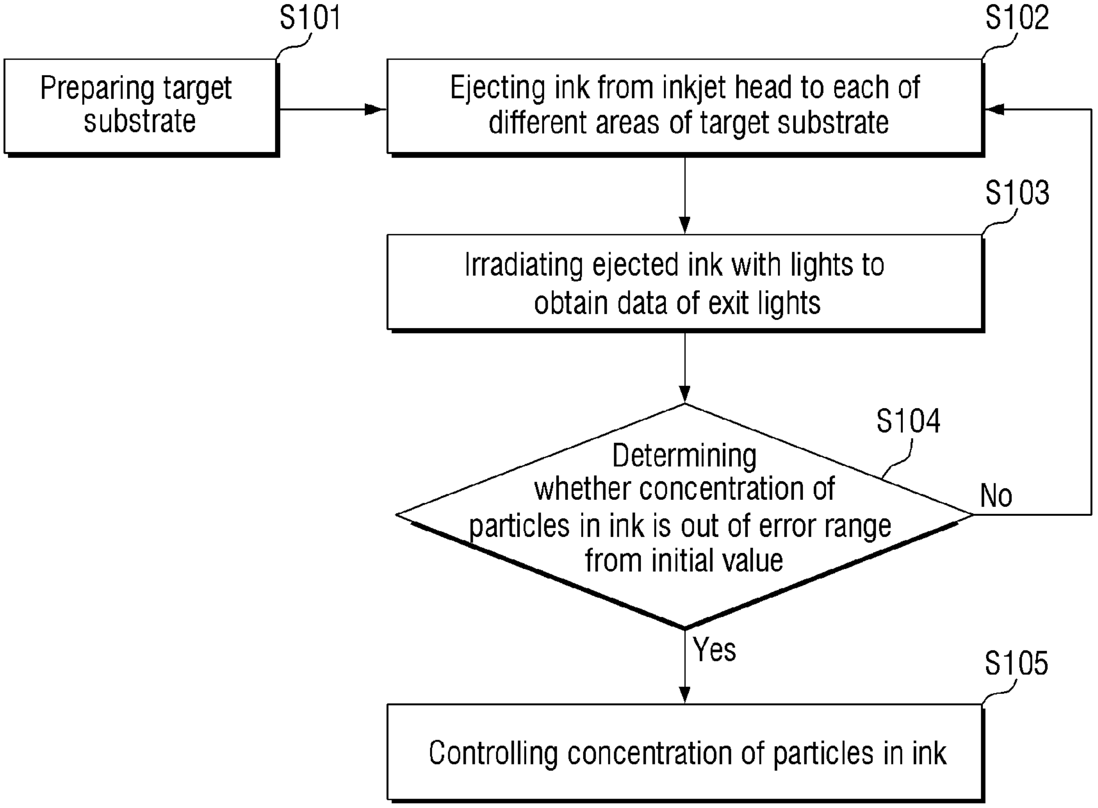
FIG. 25 is a flowchart illustrating a method of fabricating a display device according to one embodiment.

FIG. 25 is a flowchart illustrating a method of fabricating a display device according to one embodiment. FIGS. 26 to 29 are cross-sectional views illustrating a method of fabricating a display device using a method of printing the ink according to one embodiment. FIGS. 26 to 29 are views sequentially illustrating a process of forming a plurality of ink patterns JL1, JL2, JL3, . . . JLn in a method of fabricating the display device 1000 according to one embodiment.

Referring to FIGS. 25 to 29, a method of fabricating the display device 1000 according to one embodiment may include preparing the target substrate SUB (step S101), ejecting the ink DL from the inkjet head PA to each of the different areas JA1, JA2, JA3, . . . JAn of the target substrate SUB (step S102), obtaining data of the exit lights SL1 and SL2 by irradiating the ejected ink DL with the lights L1 and L2 (step S103), and determining whether the concentration of the particles PT in the ink DL deviates from the reference value (step S104). In the ink concentration measuring device 100, the processor 150 senses a change in the concentration of the particles PT in the ink DL, and according to whether the sensed value deviates from the reference value, the printing process may proceed with the ejecting the ink DL from the inkjet head PA (step S102), or may include controlling the concentration of the particles PT in the ink DL to be ejected by feeding back a change in the concentration to the inkjet head PA (step S105). In a method of fabricating the display device 1000, the steps of ejecting the ink DL (step S102), obtaining the exit light data (step S103), and determining whether it is out of the error range from the reference value based on the data (step S104) are substantially the same as described above with reference to FIGS. 12 to 16. In addition, fabricating the display device 1000 by performing the ink printing process on the target substrate SUB including the plurality of areas JA1, JA2, JA3, . . . JAn is substantially the same as described above with reference to FIGS. 21 to 24. Hereinafter, descriptions of overlapping contents will be simplified, and will be mainly described with respect to differences.

Figure 26:
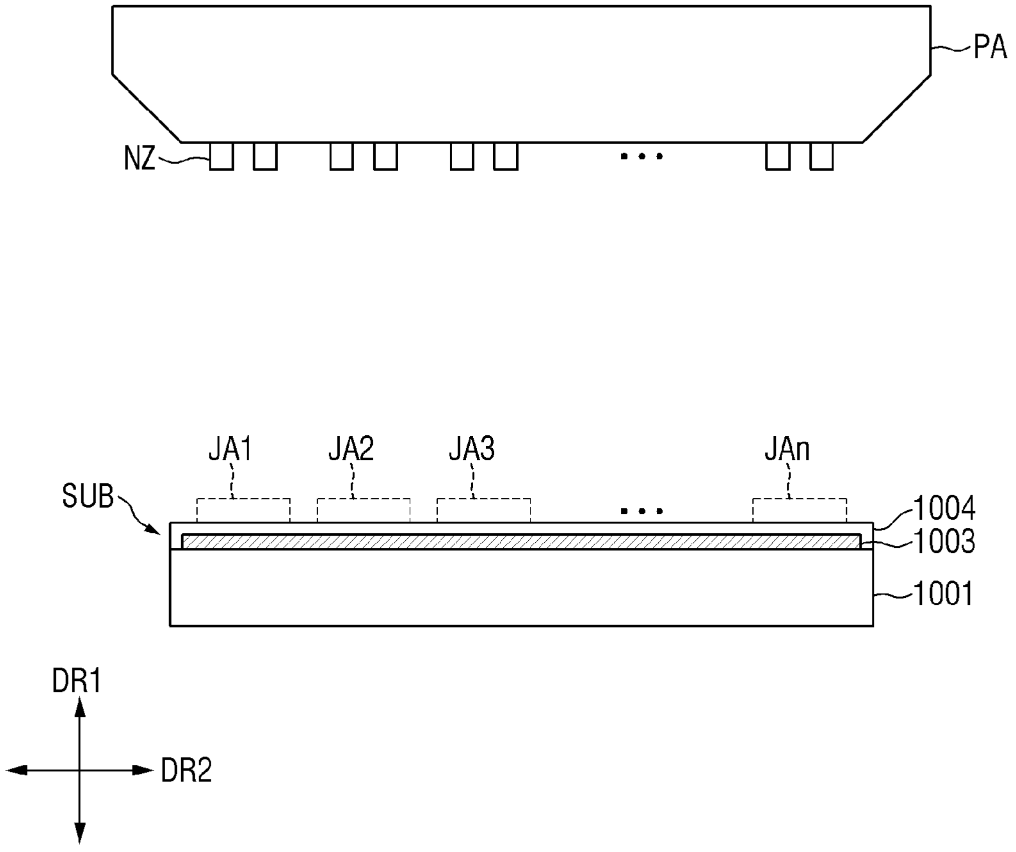
FIGS. 26 to 29 are cross-sectional views illustrating a method of fabricating a display device using a method of printing the ink according to one embodiment.

First, as illustrated in FIG. 26, the target substrate SUB on which an ink printing process is performed and which includes the plurality of areas JA1, JA2, JA3, . . . JAn is prepared (step S101). The display device 1000 may include the target substrate SUB and a plurality of ink patterns JL1, JL2, JL3, and JLn of FIG. 29 formed on the target substrate SUB. In an embodiment, the display device 1000 fabricated by utilizing the inkjet printing apparatus 10 may refer to any electronic device capable of displaying a moving image or a still image. Examples of the display device 1000 may include a television, a laptop computer, a monitor, a billboard, an Internet-of-Things device, a mobile phone, a smartphone, a tablet personal computer ("PC"), an electronic watch, a smart watch, a watch phone, a head-mounted display, a mobile communication terminal, an electronic notebook, an electronic book, a portable multimedia player ("PMP"), a navigation device, a game machine, a digital camera, a camcorder and the like, which provide a display screen.

The display device 1000 includes a display panel which provides a display screen. Examples of the display panel may include an inorganic light emitting diode display panel, an organic light emitting display panel, a quantum dot light emitting display panel, a plasma display panel and a field emission display panel. In the following description, a case where an inorganic light emitting diode display panel is applied as a display panel will be exemplified, but the disclosure is not limited thereto, and other display panels may be applied within the same scope of technical spirit.

The target substrate SUB may include a base portion 1001, a display layer 1003 disposed on the base portion 1001, and an insulating layer 1004 disposed on the display layer 1003. The target substrate SUB may include the plurality of areas JA1, JA2, JA3, . . . JAn defined on the insulating layer 1004, and a printing process using the inkjet printing apparatus 10 is performed to form the display device 1000.

Referring to the structure of the target substrate SUB, the base portion 1001 may 1001 may include a base substrate made of a transparent material and a circuit layer disposed on the base substrate. The base substrate may be made of an insulating material such as glass, quartz, or polymer resin. Further, the base substrate may be a rigid substrate, but may also be a flexible substrate which can be bent, folded or rolled.

The circuit layer disposed on the base substrate may include a plurality of switching elements. Each of the switching elements may be a thin film transistor including polysilicon or a thin film transistor including an oxide semiconductor. Although not illustrated in the drawing, a plurality of signal lines (e.g., a gate line, a data line, a power line, or the like) that transmit a signal to each of the switching elements may be further disposed on the target substrate SUB.

The display layer 1003 may be disposed on the base portion 1001 and include a plurality of light emitting elements electrically connected to the circuit layer. In an embodiment, the display layer 1003 may include a plurality of electrodes and an organic light emitting layer disposed therebetween, and the display device 1000 may be an organic light emitting display (OLED) device including an organic material as a light emitting material. Each of the plurality of electrodes may be electrically connected to a circuit layer of the base portion 1001, and the organic light emitting layer may receive an electrical signal from the electrodes to emit light. However, the disclosure is not limited thereto. In the embodiment in which the display device 1000 is not an organic light emitting display device, the display layer may include a light emitting layer or a light emitting element other than the organic light emitting layer. In addition, although not illustrated in detail in the drawings, the target substrate SUB may further include a plurality of layers or patterns disposed on the base portion 1001 and the display layer 1003.

The insulating layer 1004 may be disposed on the display layer 1003. The insulating layer 1004 may be disposed directly on the display layer 1003 to completely cover the display layer 1003. However, the disclosure is not limited thereto, and other layers may be further disposed between the insulating layer 1004 and the display layer 1003.

In one embodiment, the insulating layer 1004 may be constituted with a plurality of layers, and each layer of the insulating layer 1004 may include an inorganic insulating material or an organic insulating material. For example, the inorganic insulating material may include at least one of silicon nitride, aluminum nitride, zirconium nitride, titanium nitride, hafnium nitride, tantalum nitride, silicon oxide, aluminum oxide, titanium oxide, tin oxide, cerium oxide, silicon oxynitride (SiOxNy), or lithium fluoride. The organic insulating material may include at least one of acrylic resin, methacrylic resin, polyisoprene, vinyl resin, epoxy resin, urethane resin, cellulose resin, or perylene resin. However, the structure and material of the insulating layer 1004 are not limited to the above-described description, and the stacked structure or material may be variously modified.

The target substrate SUB may include the plurality of areas JA1, JA2, JA3, . . . JAn defined on the insulating layer 1004, and the plurality of ink patterns JL1, JL2, JL3, . . . JLn may be formed on the areas JA1, JA2, JA3, . . . Jan, respectively, according to a printing process utilizing the inkjet printing apparatus 10. The ink patterns JL1, JL2, JL3, . . . JLn formed respectively in the areas JA1, JA2, JA3, . . . JAn may be the same regardless of positions or may be different from each other according to positions. In the embodiment in which the ink patterns JL1, JL2, JL3, . . . JLn are the same regardless of positions, a method of fabricating the display device 1000 may be fabricated by the step S341 and the step S342 in the embodiment of FIG. 23. Alternatively, in the same embodiment in which the ink patterns JL1, JL2, JL3, . . . JLn are different according to positions, a method of fabricating the display device 1000 may be fabricated by the step S343 in the embodiment of FIG. 23. In the following drawings, a case where a method of fabricating the display device 1000 is fabricated by the step S341 and the step S342 in the embodiment of FIG. 23 will be exemplified and described.

Figure 27:
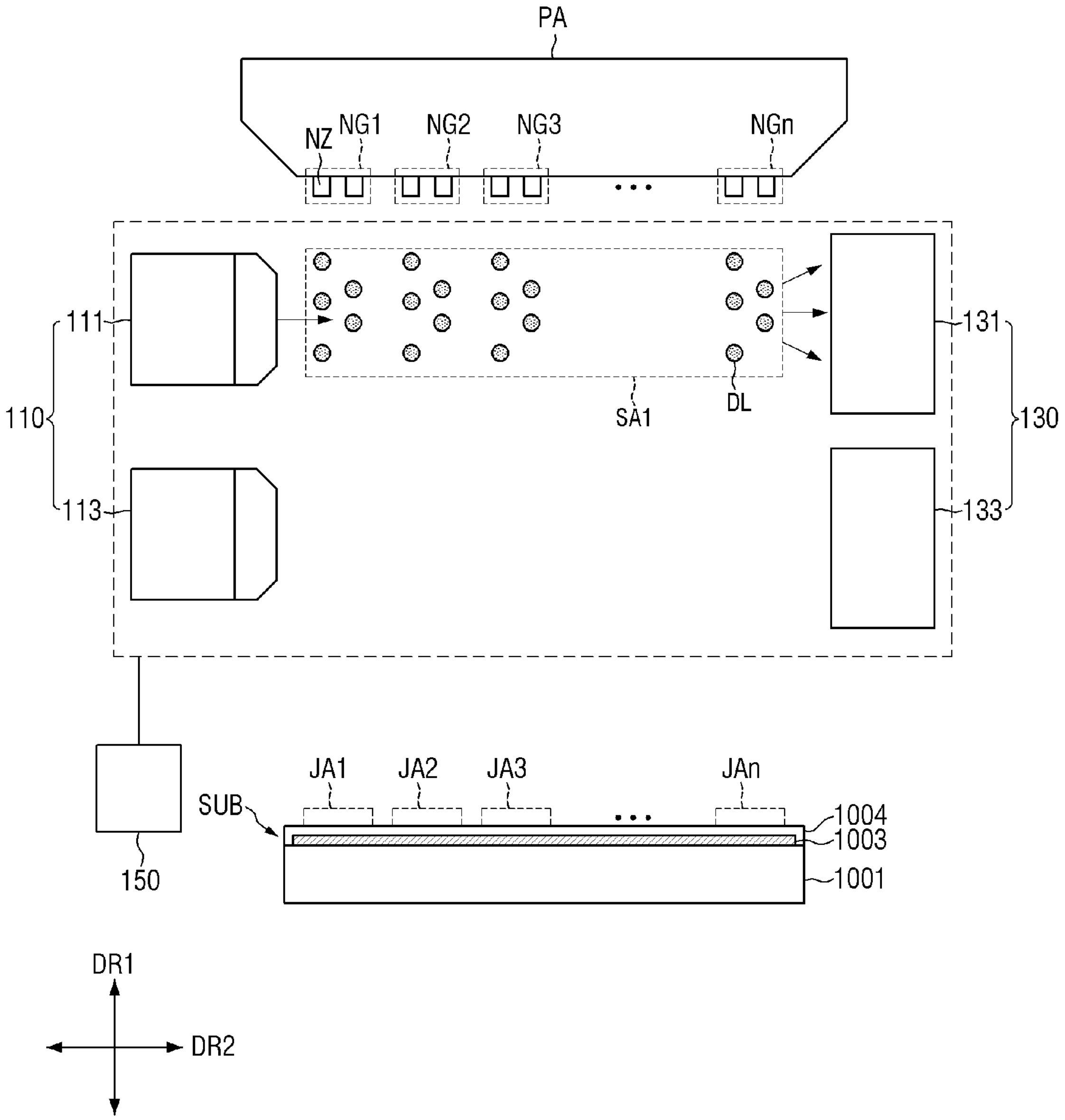
Figure 28:
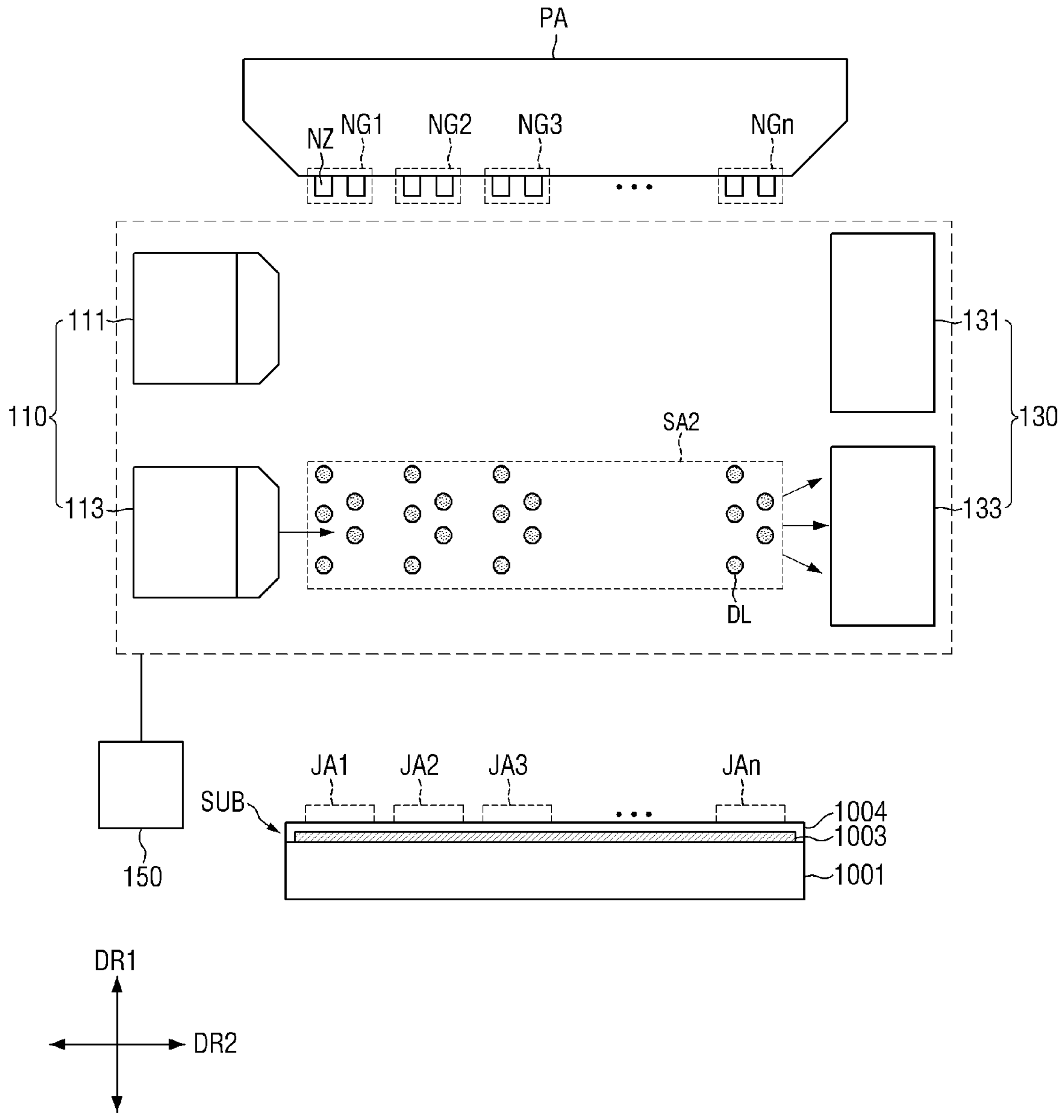

Referring to FIGS. 27 and 28, the inkjet head PA ejects the ink DL to each of the different areas JA1, JA2, JA3, . . . JAn of the target substrate SUB (step S102), and data of the exit lights SL1 and SL2 is obtained by irradiating the ejected ink DL with the lights L1 and L2 (step S103).

The first nozzle group NG1 may eject the ink DL to the first area JA1, the second nozzle group NG2 may eject the ink DL to the second area JA2, and the third nozzle group NG3 may eject the ink DL to the third area JA3. In the embodiment in which the same ink pattern JL1, JL2, JL3, . . . JLn is formed in each of the plurality of areas JA1, JA2, JA3, . . . JAn on the target substrate SUB, the ink DL having the same concentration of the particles PT may be ejected from each of the first nozzle group NG1, the second nozzle group NG2, the third nozzle group NG3, and the n-th nozzle group NGn. However, alternatively, in the embodiment in which the different ink patterns JL1, JL2, JL3, . . . JLn are formed in the plurality of areas JA1, JA2, JA3, . . . JAn on the target substrate SUB, the ink DL having the different concentration of the particles PT may be ejected from each of the first nozzle group NG1, the second nozzle group NG2, the third nozzle group NG3, and the n-th nozzle group NGn.

The ink DL may be ejected from the inkjet head PA in the first direction DR1. The ink DL may be ejected from the inkjet head PA, pass through the irradiation areas SA1 and SA2 irradiated with the light of the light irradiation device 110 (111 and 113) of the ink concentration measuring device 100, and be sprayed onto the target substrate SUB. When the ink DL ejected from the inkjet head PA passes through the first irradiation area SA1, the first light irradiation device 111 may irradiate the first irradiation area SA1 with the first light L1, and the first sensing device 131 may obtain data on the first exit light SL1 scattered from the ink DL. When the ink DL ejected from the inkjet head PA passes through the second irradiation area SA2, the second light irradiation device 113 may irradiate the second irradiation area SA2 with the second light L2, and the second sensing device 133 may obtain data on the second exit light SL2 refracted from the ink DL. A description thereof is the same as described above.

The processor 150 of the ink concentration measuring device 100 may sense a change in the concentration of the particles PT in the ink DL from data of the exit lights SL1 and SL2 acquired by the sensing device 130, and may determine whether the concentration of the particles PT in the ink DL deviates from the reference value (step S104). In the embodiment of forming the same ink pattern JL1, JL2, JL3, . . . JLn in each of the plurality of areas JA1, JA2, JA3, . . . JAn, in this step, the step S341 and the step S342 in FIG. 23 may 23 may be performed. In the embodiment in which the different ink patterns JL1, JL2, JL3, . . . JLn are formed respectively in the plurality of areas JA1, JA2, JA3, . . . JAn, in this step, the step S343 of FIG. 23 may be performed. A detailed description thereof is the same as described above and thus will be omitted. Based on the data obtained from the ink DL ejected from each of the nozzle groups NG1, NG2, NG3, . . . NGn, when it is necessary to control the concentration of the particles PT in the ink DL, the concentration is controlled (step S105), otherwise, the printing process is repeated.

Figure 29:
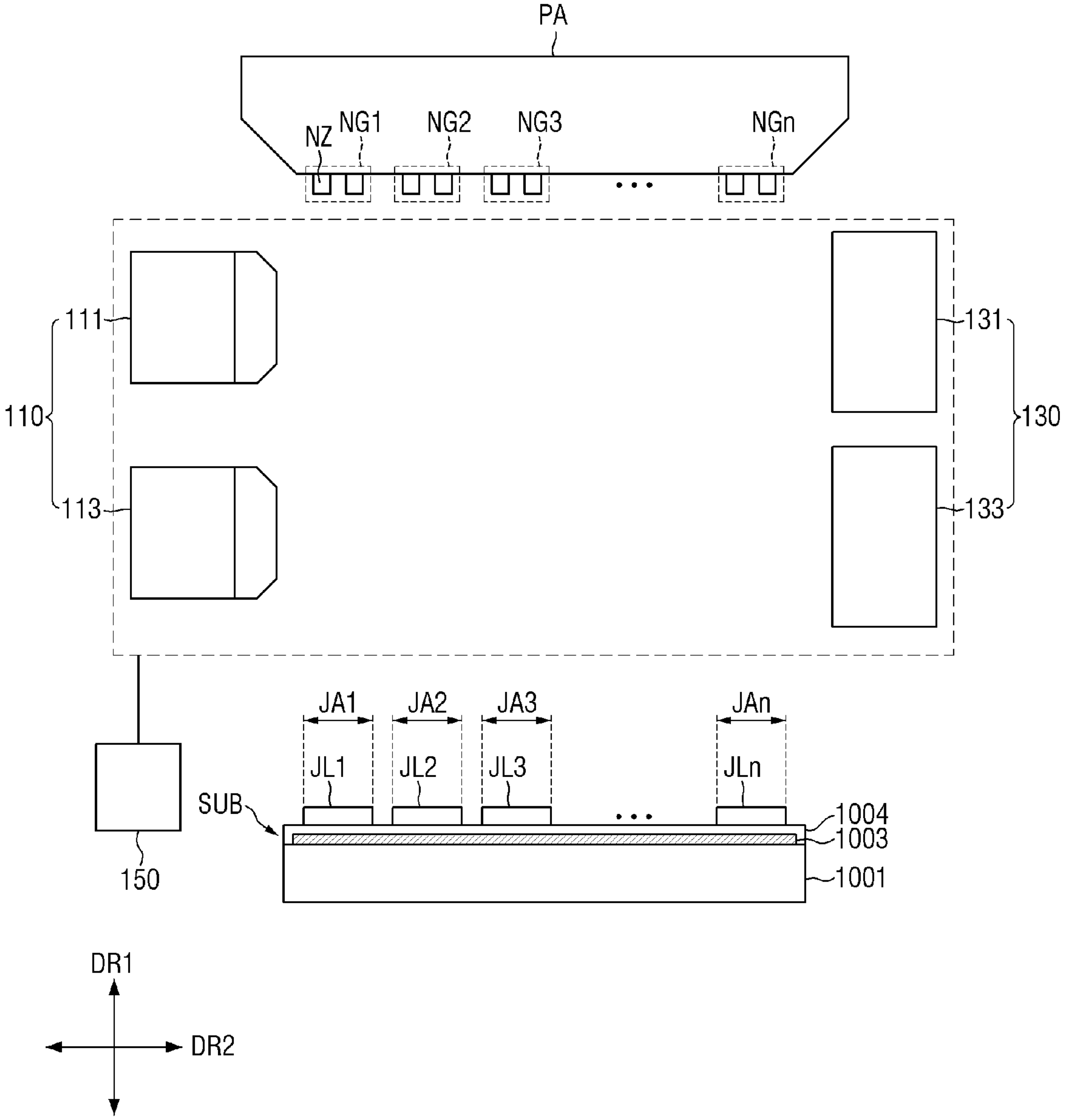

Then, referring to FIG. 29, the display device 1000 may be fabricated by forming the plurality of ink patterns JL1, JL2, JL3, . . . JLn on the target substrate SUB by performing the above process.

Figure 30:
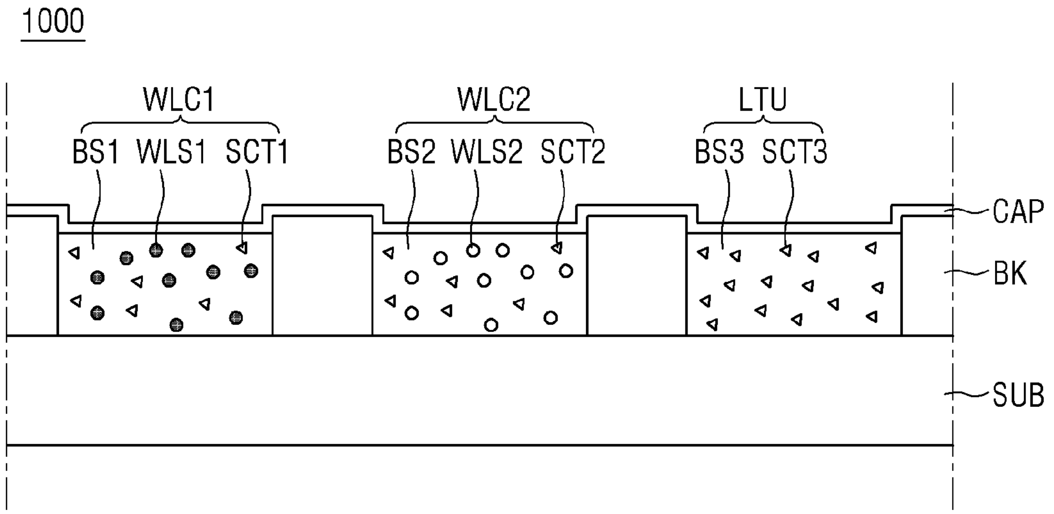
FIG. 30 is a cross-sectional view illustrating a portion of a display device according to one embodiment.

FIG. 30 is a cross-sectional view illustrating a portion of a display device according to one embodiment.

Referring to FIG. 30 in conjunction with FIG. 29, the display device 1000 according to one embodiment may include the target substrate SUB, a plurality of wavelength conversion layers WLC1 and WLC2, and light transmitting layer LTU disposed on the target substrate SUB and formed using the inkjet printing apparatus 10. In addition, the display device 1000 may further include a bank layer BK that divides the areas JA1, JA2, JA3, . . . JAn in which each of the wavelength conversion layers WLC1 and WLC2 and the light transmitting layer LTU is formed, and a capping layer CAP covering the bank layer BK, the wavelength conversion layers WLC1 and WLC2, and the light transmitting layer LTU.

The bank layer BK may surround a portion in which the wavelength conversion layers WLC1 and WLC2 and the light transmitting layer LTU are disposed on the target substrate SUB. The bank layer BK may be disposed to have a predetermined height on the target substrate SUB. In an embodiment, the bank layer BK may include an organic insulating material and may have a height in a range of 4 micrometers (μm) to 20 μm and a width in a range of 4 μm to 20 μm. However, the disclosure is not limited thereto. A case in which the side surface of the bank layer BK is perpendicular to the top surface of the target substrate SUB is exemplified in the drawing, but the disclosure is not limited thereto. In some embodiments, a side surface of the bank layer BK may be an inclined or curved shape. In one example, the bank layer BK may have a reverse tapered shape in which the width of the top surface is greater than the width of the bottom surface.

The wavelength conversion layers WLC1 and WLC2 and the light transmitting layer LTU may be disposed in an area surrounded by the bank layer BK. The wavelength conversion layers WLC1 and WLC2 and the light transmitting layer LTU may form an island-shaped pattern on the target substrate SUB. However, the disclosure is not limited thereto, and each of the wavelength conversion layers WLC1 and WLC2 and the light transmitting layer LTU may be disposed to extend in one direction to form a linear pattern.

The wavelength conversion layers WLC1 and WLC2 may include the first wavelength conversion layer WLC1 disposed in the first area JA1 and the second wavelength conversion layer WLC2 disposed in the second area JA2. The light transmitting layer LTU may be disposed in the third area JA3. In the drawings, a portion in which each of the first wavelength conversion layer WLC1, the second wavelength conversion layer WLC2, and the light transmitting layer LTU is disposed one by one is illustrated, but the disclosure is not limited thereto. The display device 1000 may include each of the first wavelength conversion layer WLC1, the second wavelength conversion layer WLC2, and the light transmitting layers LTU, which is provided in plural number.

The first wavelength conversion layer WLC1 may include a first base resin BS1 and a first wavelength conversion material WLS1 provided in the first base resin BS1. The second wavelength conversion layer WLC2 may include a second base resin BS2 and a second wavelength conversion material WLS2 provided in the second base resin BS2. The first wavelength conversion layer WLC1 and the second wavelength conversion layer WLC2 may further include a first scatterer SCT1 and a second scatterer SCT2 dispersed in a base resin, respectively.

The light transmitting layer LTU may include a third base resin BS3 and a third scatterer SCT3 contained in the third base resin BS3. The light transmitting layer LTU transmits the blue light of the third color incident from the light emitting element ED while maintaining the wavelength thereof. The third scatterer SCT3 of the light transmitting layer LTU may serve to adjust an emission path of light emitted through the light transmitting layer LTU. The light transmitting layer LTU may not include a wavelength conversion material.

The first to third scatterers SCT1, SCT2, and SCT3 may be metal oxide particles or organic particles. A description thereof is the same as described above. The first to third base resins BS1, BS2, and BS3 may include a light transmitting organic material. For example, the first to third base resins BS1, BS2, and BS3 may include an epoxy resin, an acrylic resin, a cardo resin, an imide resin, or the like. The first to third base resins BS1, BS2 and BS3 may be formed of the same material, but the disclosure is not limited thereto.

The first wavelength conversion material WLS1 may convert blue light into red light, and the second wavelength conversion material WLS2 may convert blue light into green light. The first wavelength conversion material WLS1 and the second wavelength conversion material WLS2 may be quantum dots, quantum bars, phosphors or the like. Examples of the quantum dot may include group IV nanocrystal, group II-VI compound nanocrystal, group III-V compound nanocrystal, group IV-VI nanocrystal, and a combination thereof.

The capping layer CAP may be disposed on the wavelength conversion layers WLC1 and WLC2, the light transmitting layers LTU, and the bank layer BK. The capping layer CAP may prevent impurities such as moisture or air from penetrating from the outside to damage or contaminate the wavelength conversion layers WLC1 and WLC2 and the light transmitting layers LTU. The capping layer CAP may be formed of an inorganic insulating material.

In the fabricating process of the display device 1000, each of the different wavelength conversion layers WLC1 and WLC2 and the light transmitting layer LTU may include different materials. In addition, although each of the different wavelength conversion layers WLC1 and WLC2 and the light transmitting layer LTU includes the same scatterers SCT1, SCT2 and SCT3, the concentrations of the scatterers SCT1, SCT2, and SCT3 included in each layer may be different from each other. For example, a concentration of the first scatterer SCT1 of the first wavelength conversion layer WLC1 may be different from a concentration of the second scatterer SCT2 of the second wavelength conversion layer WLC2, and the concentrations may be different from the concentration of the third scatterer SCT3 of the light transmitting layer LTU.

In one embodiment, in a method of fabricating the display device 1000 utilizing the inkjet printing apparatus 10, each of the different wavelength conversion layers WLC1 and WLC2 and the light transmitting layers LTU may be individually performed by a printing process. In this case, in the first printing process, a plurality of first wavelength conversion layers WLC1 disposed on the target substrate SUB may be formed, and in the second and third printing processes, the second wavelength conversion layer WLC2 and the light transmitting layer LTU may be formed, respectively. In the embodiment, since each of the inks DL ejected from the different nozzle groups NG1, NG2, NG3, . . . NGn of the inkjet head PA forms the same wavelength conversion layers WLC1 and WLC2 and light transmitting layers LTU, the step S341 and the step S342 of FIG. 23 may be performed. In the first printing process, a reference value for the inkjet printing apparatus 10 to form the plurality of first wavelength conversion layers WLC1 of the display device 1000 may be set, and the printing process may be performed. In the first printing process, since each of the different nozzle groups NG1, NG2, NG3, . . . NGn ejects the ink DL to form the first wavelength conversion layer WLC1, the concentrations of the particles PT in the inks DL ejected from the nozzle groups NG1, NG2, NG3, . . . NGn may be substantially maintained to be uniform with each other.

Then, when each of the second and third printing processes is performed, reference values for forming the plurality of second wavelength conversion layers WLC2 and the plurality of light transmitting layers LTU of the display device 1000 may be set, and the printing process may be performed. The reference values set in each of the second and third printing processes may be different, but may be equally applied to the plurality of nozzle groups NG1, NG2, NG3, . . . NGn.

However, the disclosure is not limited thereto. In some embodiments, in the first printing process, the inkjet printing apparatus 10 may perform a process to simultaneously form the plurality of first wavelength conversion layers WLC1, the plurality of second wavelength conversion layers WLC2, and the plurality of light transmitting layers LTU. In the embodiment, since the inks DL ejected from the different nozzle groups NG1, NG2, NG3, . . . NGn of the inkjet head PA form the different wavelength conversion layers WLC1 and WLC2 and the light transmitting layer LTU, the step S343 of FIG. 23 may be performed. In the printing process, the inkjet head PA of the inkjet printing apparatus 10 may be set with reference values for forming the different wavelength conversion layers WLC1 and WLC2 and the light transmitting layer LTU of the display device 1000 at the different nozzle groups NG1, NG2, NG3, . . . NGn, and a printing process may be performed. For example, the first ink DL1 for forming the first wavelength conversion layer WLC1 in the first area JA1 may be ejected from the first nozzle group NG1, the second ink DL2 for forming the second wavelength conversion layer WLC2 in the second area JA2 may be ejected from the second nozzle group NG2, and the third ink DL3 for forming the light transmitting layer LTU in the third area JA3 may be ejected from the third nozzle group NG3. The concentrations of the particles PT in the inks DL ejected from the nozzle groups NG1, NG2, NG3, . . . NGn may have different values and may be individually maintained to be uniform.

In the above embodiments, when the concentration of the particles PT in the ink DL is changed during the printing process of the ink DL, a case where the particle PT concentration of the ink DL introduced into the inkjet head PA is adjusted has been described. However, as described above, the ink patterns JL1, JL2, JL3, . . . JLn finally formed on the target substrate SUB may vary depending on the number of particles PT with respect to the entire ink DL ejected to each of the areas JA1, JA2, JA3, . . . JAn of the target substrate SUB. According to one embodiment, in a method of fabricating the display device 1000 using the inkjet printing apparatus 10, when the concentration of the particles PT in the ink DL ejected from any one nozzle NZ is low, to compensate this, the ink DL may be ejected to the corresponding area from another nozzle NZ. That is, in a method of fabricating the display device 1000 according to one embodiment, the different inks DL may be ejected as the inks DL having the different concentrations of the particles PT on one area of the target substrate SUB.

Figure 31:
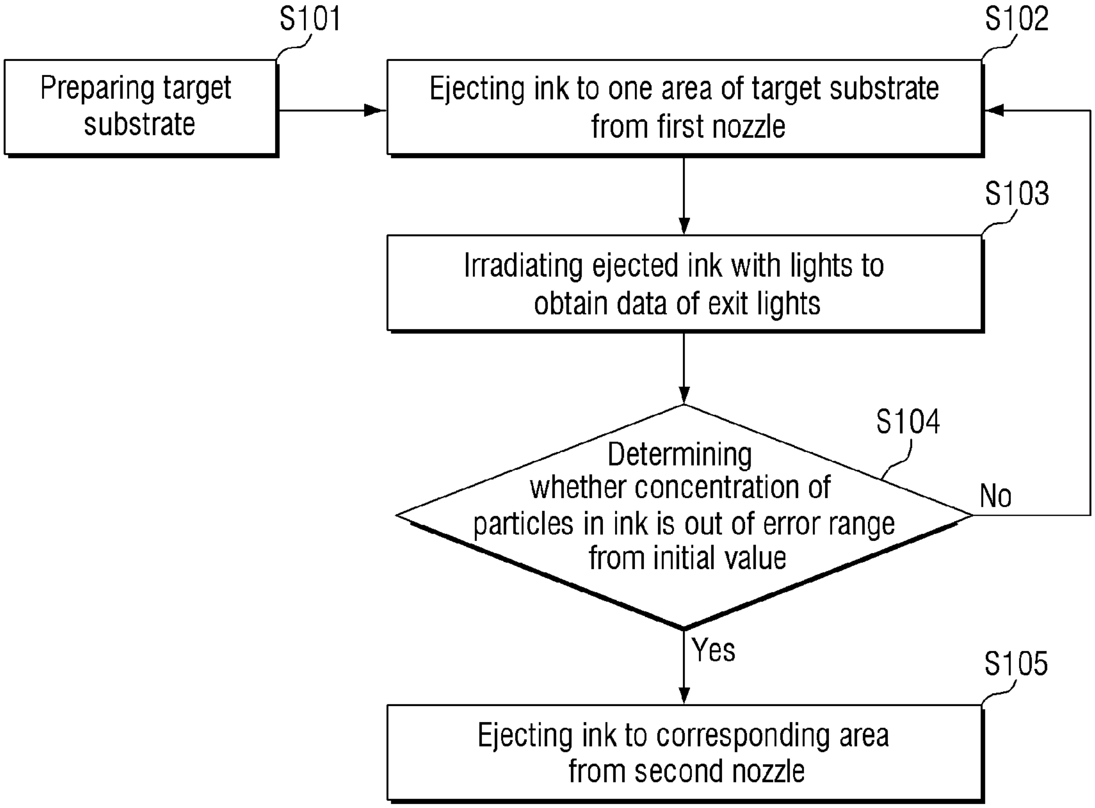
FIG. 31 is a flowchart illustrating a method of fabricating a display device according to another embodiment.
Figure 32:
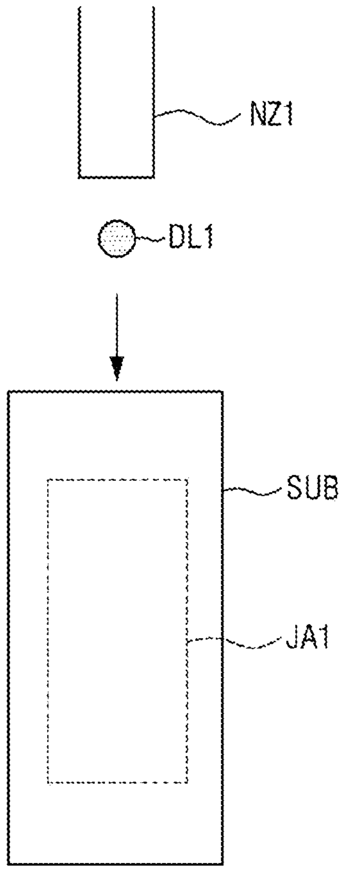
FIGS. 32 and 33 are cross-sectional views illustrating one step of the method of fabricating the display device of FIG. 31.
Figure 33:
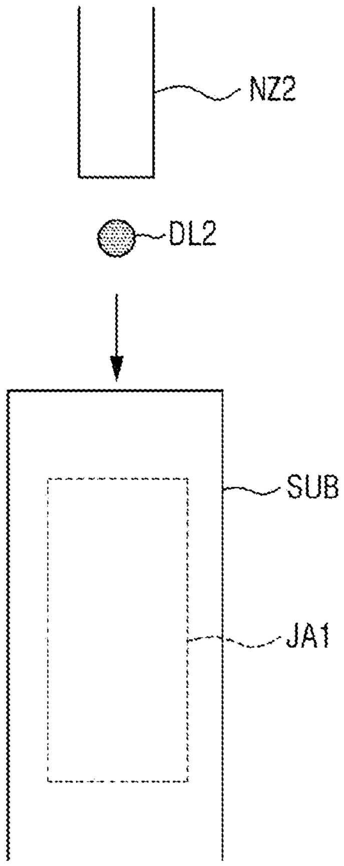

FIG. 31 is a flowchart illustrating a method of fabricating a display device according to another embodiment. FIGS. 32 and 33 are cross-sectional views illustrating one step of the method of fabricating the display device of FIG. 31.

Referring to FIGS. 31 to 33, a method of fabricating the display device 1000 according to one embodiment may include preparing the target substrate SUB including the different areas JA1, JA2, JA3, . . . JAn (step S101), ejecting ink to one area of the target substrate SUB from the first nozzle NZ1 (step S102), obtaining data of the exit lights SL1 and SL2 by irradiating the ejected ink DL with the lights L1 and L2 (step S103), determining whether the concentration of the particles PT in the ink DL deviates from the reference value (step S104), and ejecting the ink DL to the corresponding area from the second nozzle NZ2 (step S105). The embodiment is different from the embodiment of FIG. 25 in that step S105 is substantially different. In the following description, redundant description will be omitted while focusing on differences.

When the first ink DL1 is ejected from the first nozzle NZ1 to the first area JA1, the exit light data is acquired by irradiating the first light L1 and the second light L2 to calculate the concentration of the particles PT of the ink DL. The description of this step is the same as described above.

Next, when it is determined that the concentration of the particles PT in the ink DL ejected to the first area JA1 deviates from the reference value based on the acquired exit light data, the second ink DL2 is ejected to the first area JA1 through the second nozzle NZ2 different from the first nozzle NZ1. In the first area JA1, the first ink DL1 ejected from the first nozzle NZ1 and the second ink DL2 ejected from the second nozzle NZ2 may be mixed. When the concentration of the particles PT of the first ink DL1 has a value deviating from the reference value, the ink concentration measuring device 100 of the inkjet printing apparatus 10 may sense the deviation, which may be compensated by the second nozzle NZ2 different from the first nozzle NZ1. The second nozzle NZ2 may eject the second ink DL2 to the first area JA1 to which the first ink DL1 has been ejected.

Although not illustrated in the drawing, the second nozzle NZ2 may eject the second ink DL2 to the second area JA2 other than the first area JA1 when the first ink DL1 is ejected from the first nozzle NZ1 to the first area JA1. When the second ink DL2 is ejected, the exit light data for the second ink DL2 may be acquired by irradiating the first light L1 and the second light L2 in the same manner as the first ink DL1. When it is sensed from the exit light data for the first ink DL1, that the concentration of the particles PT of the first ink DL1 is low, the ink concentration measuring device 100 may find the nozzle NZ that ejects the ink DL having the concentration of the particles PT that is additionally desirable in the first area JA1. When the second ink DL2 has the concentration of the particles PT that is as much as the insufficient concentration for the first ink DL1 ejected from the first nozzle NZ1, after the first ink DL1 is ejected, the ink may be further ejected to the first area JA1 using the second nozzle NZ2. The first ink DL1 and the second ink DL2 are ejected in different processes, but may be ejected to the same area (e.g., the first area JA1) to form one ink pattern JL1, JL2, JL3, . . . JLn. By sensing the concentration of the particles PT in the ink DL ejected to a predetermined area in real time, the inkjet printing apparatus 10 not only may control the concentration of the particles PT of the ink DL ejected through the nozzle NZ, but also may adjust or compensate the concentration of the particles PT in the ink DL ejected to the corresponding areas JA1, JA2, JA3, . . . JAn through other adjacent nozzles NZ.

In concluding the detailed description, those skilled in the art will appreciate that many variations and modifications can be made to the preferred embodiments without substantially departing from the principles of the invention. Therefore, the disclosed preferred embodiments of the invention are used in a generic and descriptive sense only and not for purposes of limitation.

What is claimed is:

1. A method of printing ink, comprising:

ejecting ink in which a plurality of particles is dispersed from an inkjet head;

irradiating the ejected ink with a first light and a second light having different wavelengths; and calculating a concentration of the particles in the ink from the data on a first exit light and a second exit light from the ink;

wherein the first light has a wavelength of about 500 nanometers (nm) or less, and the second light has a wavelength of about 1000 nm or more.

2. The method of claim 1, wherein the first exit light is light obtained by scattering the first light irradiated to the ink, and the second exit light is light obtained by refracting the second light irradiated to the ink.

3. The method of claim 2, wherein the calculating of the concentration of the particles comprises:

acquiring data on number of the particles in the ink from the data on the first exit light; and acquiring data on a volume of the ink from the data on the second exit light.

4. The method of claim 2, further comprising: calculating a concentration change value of the particles in the ink from the data on the first exit light and the second exit light.

5. The method of claim 2, further comprising: based on determination that the concentration is out of the error range from a reference value, controlling the concentration of the particles in the ink injected into the inkjet head.

6. The method of claim 1, further comprising: before ejecting the ink from the inkjet head, setting a reference value.

7. The method of claim 6, wherein the reference value includes a normalized scattering intensity of light emitted from the ink and a standard deviation value of the normalized scattering intensity when the first light and the second light are irradiated to ink having different particle concentrations, the calculating a concentration of the particles in the ink comprises acquiring normalized scattering intensities of the first exit light and the second exit light and standard deviation values of the normalized scattering intensities, and calculating the concentration of the particles in the ink by comparing the normalized scattering intensity and the standard deviation value of the reference value with the data on the first exit light and the second exit light.

8. The method of claim 1, wherein the ink is ejected from the inkjet head in a first direction, and the first light and the second light are irradiated in different directions and irradiated to the ink at the same time, respectively.

9. A method of printing ink, comprising:

ejecting ink in which a plurality of particles is dispersed from an inkjet head;

irradiating the ejected ink with a first light and a second light having different wavelengths; and calculating a concentration of the particles in the ink from the data on a first exit light and a second exit light from the ink;

wherein the first light has a wavelength of about 500 nanometers (nm) or less, and the second light has a wavelength of about 1000 nm or more, wherein the ink is ejected from the inkjet head in a first direction, the first light is irradiated in a second direction perpendicular to the first direction, and the second light is irradiated after the first light is irradiated.

10. The method of claim 9, wherein the first exit light emitted from the ink is reflected by a reflector having a center of curvature in a path through which the ink is ejected and having a curved outer surface.

11. An inkjet printing apparatus comprising:

an inkjet head which ejects ink in which a plurality of particles is dispersed;

a first light irradiation device and a second light irradiation device which irradiate lights of different wavelength bands, respectively, to the ejected ink;

a first sensing device on which a first exit light is incident, wherein the first exit light is obtained by scattering a first light irradiated from the first light irradiation device and incident on the ink; and a second sensing device on which a second exit light is incident, wherein the second exit light is obtained by scattering a second light irradiated from the second light irradiation device and incident on the ink;

wherein the first light irradiated from the first light irradiation device has a wavelength of about 500 nm or less, and the second light irradiated from the second light irradiation device has a wavelength of about 1000 nm or more.

12. The inkjet printing apparatus of claim 11, wherein the ink is ejected from the inkjet head in a first direction, and the first light irradiation device irradiates the first light in a second direction perpendicular to the first direction.

13. The inkjet printing apparatus of claim 12, wherein the second light irradiation device is disposed to be spaced apart from the first light irradiation device in the first direction, and irradiates the second light in the second direction.

14. The inkjet printing apparatus of claim 13, wherein the first light irradiation device and the second light irradiation device irradiate the first light and the second light, respectively, to different areas in a path through which the ink is ejected.

15. The inkjet printing apparatus of claim 12, wherein the first sensing device is disposed opposing and to face the first light irradiation device with respect to a path through which the ink is ejected, and the second sensing device is disposed opposing and to face the second light irradiation device with respect to the path through which the ink is ejected.

16. The inkjet printing apparatus of claim 12, further comprising a first reflector disposed to be spaced apart from the first light irradiation device, wherein the first reflector has a center of curvature in a path through which the ink is ejected and has a curved outer surface, wherein the first exit light is reflected from the first reflector and is incident on the first sensing device.

17. The inkjet printing apparatus of claim 16, wherein the first sensing device is disposed on a first side opposite to a second side where the first reflector is located with respect to the path through which the ink is ejected.

18. The inkjet printing apparatus of claim 16, further comprising a second reflector disposed to be spaced apart from the second light irradiation device, wherein the second reflector has a center of curvature in the path through which the ink is ejected and has a curved outer surface, wherein the second exit light is reflected from the second reflector and is incident on the second sensing device.

19. The inkjet printing apparatus of claim 12, wherein the second light irradiation device is disposed to be spaced apart from the first light irradiation device in the first direction and irradiates the second light in a direction between the first direction and the second direction, and the first light irradiation device and the second light irradiation device irradiate the first light and the second light to the ejected ink, respectively.

20. The inkjet printing apparatus of claim 11, further comprising:

a processor to which data on the first exit light and the second exit light incident on the first sensing device and the second sensing device, respectively, are inputted, wherein the processor stores data on the first exit light and the second exit light according to different concentrations of the particles in the ink.

* * * * *